United States Patent [19]
Osaka et al.

[11] Patent Number: 6,034,878
[45] Date of Patent: Mar. 7, 2000

[54] SOURCE-CLOCK-SYNCHRONIZED MEMORY SYSTEM AND MEMORY UNIT

[75] Inventors: Hideki Osaka, Hiratsuka, Japan; Masaya Umemura, Hillsboro, Oreg.; Akira Yamagiwa, Oisomachi; Toshitsugu Takekuma, Ebina, both of Japan

[73] Assignee: Hitachi, Ltd., Tokyo, Japan

[21] Appl. No.: 08/992,210

[22] Filed: Dec. 16, 1997

[30] Foreign Application Priority Data

Dec. 16, 1996 [JP] Japan ................................ P08-335661

[51] Int. Cl.$^7$ .................................................. G11C 13/00
[52] U.S. Cl. ................................ 365/52; 365/51; 365/63; 365/233
[58] Field of Search ............................... 365/52, 63, 51, 365/233

[56] References Cited

U.S. PATENT DOCUMENTS

| | | | |
|---|---|---|---|
| 5,120,114 | 6/1992 | Schlichenmaier et al. | 303/100 |
| 5,189,638 | 2/1993 | Kimura | 365/52 |
| 5,200,917 | 4/1993 | Shaffer et al. | 365/52 X |
| 5,229,960 | 7/1993 | De Givry | 365/52 X |
| 5,272,664 | 12/1993 | Alexander et al. | 365/52 |
| 5,313,416 | 5/1994 | Kimura | 365/52 |
| 5,390,149 | 2/1995 | Vogley et al. | 365/189.01 |
| 5,495,435 | 2/1996 | Sugahara | 365/52 |
| 5,587,954 | 12/1996 | Vogley et al. | 365/221 |
| 5,621,678 | 4/1997 | Barnaby et al. | 365/52 |
| 5,867,417 | 2/1999 | Wallace et al. | 365/52 |

FOREIGN PATENT DOCUMENTS

| | | |
|---|---|---|
| 5-120114 | 5/1993 | Japan . |
| 7-202947 | 8/1995 | Japan . |
| 7-283836 | 10/1995 | Japan . |

OTHER PUBLICATIONS

VLSI System Design, Fundamentals of Circuits and Packaging, Maruzen, 1995, pp. 356–360 (in Japanese, no English translation).

"SyncLink—A Proposal for an Implementation of IEEE P1596.4 'Ramlink' Optimized for Small (single board) Memory Systems", H. Wiggers, Hewlett Packard, Mar. 23, 1995.

*Primary Examiner*—Do Hyun Yoo
*Attorney, Agent, or Firm*—Antonelli, Terry, Stout & Kraus, LLP

[57] ABSTRACT

A source-clock-synchronized memory system having a large data storage capacity per memory bank and a high mounting density. The invention includes a memory unit having a first memory riser board B1 mounted on a base board through a first connector C1 and a second memory riser board B2 mounted on the base board BB through a second connector C2. The first memory riser board has a plurality of first memory modules mounted on the front surface thereof and the second memory riser board has a plurality of second memory modules mounted on the front surface thereof. The first and second memory riser boards are arranged in such a way that the back surface of the first memory riser board faces the back surface of the second memory riser board. The invention further includes a board linking connector for connecting signal lines on the first memory riser board to corresponding signal lines on the second memory riser board.

31 Claims, 20 Drawing Sheets

SOURCE-CLOCK-SYNCHRONIZED MEMORY SYSTEM AND MEMORY UNIT

CROSS REFERENCE TO RELATED APPLICATIONS

This application is related to application Ser. No. 08/869,890, filed Jun. 5, 1997 entitled "Signal Transmission System" by T. Takekuma, et al., the contents of which are incorporated herein by reference.

BACKGROUND OF THE INVENTION

The present invention relates to a technology for exchanging signals between a memory controller and a memory device employed in an information processing apparatus. More particularly, the present invention relates to a memory system for transmitting signals at a high speed to a plurality of memory devices connected to a common transmission line.

In order to implement the IEEE P1596.4 (SyncLink), there has been proposed RamLink, a high-speed memory system employed in an information processing apparatus as disclosed in "SyncLink: A Proposal for an Implementation of IEEE P1596.4 'Ramlink' Optimized for Small (Single-Board) Memory System" by H. Wiggers, Hewlett Packard Company, which was published Mar. 23, 1995, pp 1–6. RamLink is a DRAM system for implementing a transfer speed equal to or higher than 500 Mbytes/s as a bandwidth. Five different topologies have been proposed. As a characteristic of a fourth option among the five proposed topologies, there is provided a system wherein read data is folded in order to reduce the number of skews.

According to this technique, a memory system comprises memory modules 10-0 to 10-7 each incorporating 8 to 9 or 16 to 18 DRAMs (Dynamic Random Access Memories) as shown in FIG. 20. Much like an SDRAM (Synchronous Dynamic Random Access Memory), each DRAM mounted in a memory module has various kinds of timing prescribed with respect to a clock signal. A SDRAM is disclosed in Japanese Patent Laid-open No. Hei5-120114.

The memory modules are arranged in a configuration shown in FIG. 21. As shown in FIG. 21, a memory riser board B0 is erected on a base board BB through a connector C0. Memory modules are provided on the memory riser board B0 in the horizontal direction at fixed intervals.

A memory controller 100 shown in FIG. 20 is provided on the base board BB shown in FIG. 21. The memory modules 10-0 to 10-7 are connected to the memory controller 100 by control lines such as a clock (CLK) line S1, an address (ADR) line S2, a data (DATA) line S3, a CS (Chip Select) line (not shown), a RAS (Row Address Strobe) line (not shown) and a CAS (Column Address Strobe) line (not shown). It should be noted that the address line S3 may include lines for providing command signals such as the chip select line, row address strobe line and the column address strobe line. Accordingly, the address line can be an address/command line.

As shown in FIG. 20, the data line S3 starting from the memory controller 100 is wired to the memory modules 10-0 to 10-7 sequentially one after another before being folded back to the memory controller 100 to form a ring-type bus. Thus, data read out from one of the memory modules 10-0 to 10-7 is propagated to the memory controller 100 through a U-shaped folded path. The wiring and the interface of the data line S3 are the same as a clock line S1 and the address/command line S2 except that only the data line S3 forms a ring-type bus.

With the memory modules 10-0 to 10-7 and the memory controller 100 having a configuration described above, in an operation to write data into the DRAM in one of the memory modules 10-0 to 10-7, a clock signal and the data are supplied to the memory module through the clock line S1 and the data line S3 respectively in addition to an address and a control signal which are fed to the memory module via the address/command line S2.

As described above, the clock line S1, the address/command line S2 and the data line S3 have the same wiring and interfaces so that signals propagated from the memory controller 100 to any of the memory modules 10-0 to 10-7 have the same waveform and an equal propagation time. As a result, the clock signal, the address signal, the control signal and the data signal are supplied to the memory module at the same phase and with the same timing, allowing the data to be written into the DRAM in the desired memory module. Also in an operation to read out data from the DRAM in one of the memory modules 10-0 to 10-7, the data can be taken in by the memory controller 100 with the same timing without regard to which memory module the data is read out from. The technique described above is referred to as a source-clock-synchronized bus system.

In addition, by arranging the memory modules 10-0 to 10-7 on the memory riser board B0 in the horizontal direction at fixed intervals and vertically erecting the memory riser board B0 on the base board BB through the connector C0 as shown in FIG. 21, a plurality of memory modules can be mounted. Furthermore, by vertically erecting the memory riser board B0 on the base board BB through the connector C0, a larger number of memory modules can be provided in comparison with a configuration wherein memory modules are mounted directly on the base board BB.

If there is a limit on the size of a box for accommodating the boards described above, then there is a corresponding limit on a height of the memory riser board B0. As a result, the number of memory modules that can be mounted on the memory riser board B0 is also limited.

Thus, according to the above, when a source-clock-synchronized bus system using a data line S3 is implemented by a piece of memory riser board B0, the number of memory modules 10 that can be connected to a data line (memory bus) is limited by the height limitation. Therefore, the memory capacity per memory bus (memory bank) is limited due to restriction on the height of the memory riser board B0. Here, a memory bank means a memory bus of one source-clock-synchronized bus.

Since the memory controller 100 is connected to the input and output of the data line S3 which is a ring-type bus wired to the memory modules, there is raised a problem that a number of terminals (pins) for the data signal are required. In particular, most of memory controllers are capable of driving a plurality of memory banks. In the case of such a memory controller, a number of terminals (pins) for as many data signals as memory banks are required for controlling the memory banks.

In order to solve the problem of the limited data storage capacity per memory bank described above, in a conventional source-clock-synchronized memory system, the clock line, the address/command line and the data line starting from the memory controller 100 are wired around the memory modules 10-0 to 10-7 mounted on a memory riser board B0 through the connector C0-1 and, then starting from the connector C0-1, further wired around the memory modules 10-8 to 10-15 mounted on another memory riser board B0 through the connector C0-2 as shown in FIG. 21 to form a ring topology with only the data line returning to the memory controller 100. In this way, the data storage capacity per memory bank can be increased. In such a conventional configuration, however, there is raised a problem that, if any of the memory riser boards B0 is pulled out from the base board BB, the connection with its connector C0 is cut off, thereby breaking the ring topology.

Further, by using the configuration described above, the length of the clock line, address/command line and the data line becomes very long thereby increasing the potential for noise on such lines. In addition the flight time of signals on the lines increases the further the memory modules are from the memory controller. This phenomena which particularly affects the data line can serve to reduce synchronization between data signals and address/command signals and reduce the speed of memory access operations. Further, due to this increasing length of the signal lines, noise on the signal lines increases.

SUMMARY OF THE INVENTION

It is an object of the present invention to provide a source-clock-synchronized memory system having a large data storage capacity per memory bank and a high mounting density resulting from the adoption of an efficient mounting technique.

It is another object of the present invention to provide a source-clock-synchronized memory system having a reduced number of terminals (pins) provided on the memory controller.

It is yet another object of the present invention to provide a source-clock-synchronized memory system allowing a plurality of memory riser boards to be connected to form a ring topology.

It is still yet another object of the present invention to provide a source-clock-synchronized memory system that shortens the length of signal lines in the memory unit thereby improving the synchronization between data and address/command signals, reducing accessing speed of the memory unit and reducing noise on the signal lines.

In order to achieve the objects of the present invention described above, the present invention provides a source-clock-synchronized memory system for use in apparatuses such as an information processing system that includes a base board, and a memory controller provided on the base board.

The source-clock-synchronized memory system includes a memory unit that is mounted on the base board. The memory unit includes a first memory riser board mounted on the base board through a first connector with a plurality of first memory modules mounted on the front surface of the first memory riser board, and a second memory riser board mounted on the base board through a second connector with a plurality of second memory modules mounted on the front surface of the second memory riser board. The first and second memory riser boards are arranged in such a way that the back surface of the first memory riser board faces the back surface of the second memory riser board. The memory unit further includes a board linking connector for connecting signal lines on the first memory riser board to corresponding signal lines on the second memory riser board.

The signal lines include clock, address/command and data lines. The signal lines start from the memory controller, pass through the first connector, are wired to the first memory modules mounted on the first memory riser board sequentially one module after another, pass through the board linking connector, and are wired to the second memory modules mounted on the second memory riser board sequentially one module after another. At least the data line further passes through the second connector and is connected back to the memory controller.

According to the source-clock-synchronized memory of the present invention as described above, the board linking connector is used for connecting signal lines on the first memory riser board to corresponding signal lines on the second memory riser board. As a result, the data storage capacity per memory bank can be increased without increasing the height of the memory riser board.

In the source-clock-synchronized memory system described above, the address/command line is ended by a matching terminator on the second memory riser board and the clock line further passes through the second connector, being connected back to the memory controller. As an alternative, the clock and address/command lines are each ended by a matching terminator on the second memory riser board.

According to one aspect of the present invention, the source-clock-synchronized memory system described above can be provided with a switch disposed on the base board. The switch connects the data line wired to the memory controller to either the data line on the first memory riser board passing through the first connector or the data line on the second memory riser board passing through the second connector in response to a control signal generated by the memory controller. Thus, data to be written into a desired memory module in the memory unit can be transferred from the memory controller to the desired memory module through the data line by way of the switch and the first connector whereas data read out from a desired memory module in the memory unit can be transferred from the desired memory module to the memory controller through the data line by way of the second connector and the switch.

In the source-clock-synchronized memory system according to the aspect of the present invention described above, the switch is actuated to connect the data line wired to the memory controller to either the data line passing through the first connector or the data line passing through the second connector so that data written into or read out from a desired memory module can propagate through the same data line wired to the memory controller. As a result, the number of terminals (pins) provided on the memory controller can be reduced.

The above-described objects of the present invention can also be achieved by providing a source-clock-synchronized memory system for use in apparatuses such as an information processing system that includes a base board, and a memory controller provided on the base board.

The source-clock-synchronized memory system includes a memory unit that is mounted on the base board. The memory unit includes a memory riser board mounted on the base board through at least a connector with a plurality of front memory modules mounted on the front surface and a plurality of back memory modules mounted on the back surface of the memory riser board.

The signal lines includes clock, address/command and data lines. The signal lines start from the memory controller, pass through the connector, are wired to the front memory modules mounted on the front surface of the first memory riser board sequentially one module after another, pass through the top of the memory riser board, and are wired to the back memory modules mounted on the back surface of the memory riser board sequentially one module after another. At least the data line further passes through the connector and is connected back to the memory controller.

The memory modules are mounted on both the front and back surfaces of a memory riser board and signal lines are stretched from the front surface of the memory riser board to the back surface thereof through the top of the board. As a result, the data storage capacity per memory bank can be increased without increasing the height of the memory riser board and without increasing the number of components such as connectors.

According to another aspect of the present invention, there is provided a source-clock-synchronized memory system for use in apparatuses such as an information processing system that includes a base board, and a memory controller provided on the base board.

The source-clock-synchronized memory system includes a memory unit that is mounted on the base board. The memory unit includes a memory riser board mounted on the base board through at least a connector with a plurality of memory modules mounted on the front and back surfaces of the memory riser board and a switch provided on the memory riser board for connecting a data line wired to the connector to one of two data lines wired to the modules in response to a control signal output by the memory controller.

Signal lines including clock and address/command lines start from the memory controller, pass through the connector and are wired to the memory modules mounted on the front and back surfaces of the memory riser board sequentially one module after another. A data line including the data line wired to the connector and the two data lines wired to the memory modules starts from the memory controller, passes through the connector and the switch, is wired to the memory modules mounted on the front and back surfaces of the memory riser board sequentially one module after another, passes through the switch again and is folded back to the memory controller.

A modification of the source-clock-synchronized memory system described above can be provided where the memory controller and the memory unit are provided on the base board.

The memory unit can be configured to include a first memory riser board mounted on the base board through a first connector with a plurality of first memory modules mounted on the front surface of the first memory riser board, and a second memory riser board mounted on the base board through a second connector with a plurality of second memory modules mounted on the front surface of the second memory riser board. The first and second memory riser boards are arranged in such a way that the back surface of the first memory riser board faces the back surface of the second memory riser board. The memory unit further includes a board linking connector for connecting signal lines on the first memory riser board to corresponding signal lines on the second memory riser board.

The signal lines includes clock, address/command and data lines. The signal lines start from contact points on the first connector, are wired to the first memory modules mounted on the first memory riser board sequentially one module after another, pass through the board linking connector, and are wired to the second memory modules mounted on the second memory riser board sequentially one module after another. At least the data line is further extended to another contact point on the second connector.

As an alternative, the memory unit can be configured to include a memory riser board mounted on the base board through at least a connector with a plurality of front memory modules mounted on the front surface and a plurality of back memory modules mounted on the back surface of the memory riser board. The signal lines including clock, address/command and data lines start from contact points on the connector, are wired to the front memory modules mounted on the front surface of the first memory riser board sequentially one module after another, pass through the top of the memory riser board, and are wired to the back memory modules mounted on the back surface of the memory riser board sequentially one module after another. At least the data line is further extended to another contact point on the connector.

According to another aspect of the present invention, there is provided a source-clock-synchronized memory system for use in apparatuses such as an information processing system that includes a base board, and a memory controller mounted on the base board.

The source-clock-synchronized memory system includes a plurality of memory units as described above.

The contact points on the connector of a first one of the memory units are wired to the memory controller. The ends of the signal lines on any one of the memory units are wired through the connector thereof to the contact points on the connector of the immediately succeeding one of the memory units to form a daisy chain connecting the memory modules of all of the memory units to the memory controller.

At least the data line in the last one of the memory units is further extended from the other contact point on the connector of the last memory unit to the memory controller. A plurality of memory units connected in the manner described above form a memory bank. The data storage capacity of each memory bank formed in the above-described manner can be easily increased by connecting additional memory units.

According to yet another aspect of the present invention, there is provided a source-clock-synchronized memory system for use in apparatuses such as an information processing system that includes a base board, and a memory controller mounted on the base board.

The source-clock-synchronized memory system includes a plurality of memory units as described above, and a first switch provided on the base board for connecting first controller-side signal lines wired to the memory controller to first module-side signal lines wired to one of the memory units selected by a first control signal generated by the memory controller.

The system further includes a second switch provided on the base board for connecting second controller-side signal lines wired to the memory controller to second module-side signal lines wired to one of the memory units selected by a second control signal generated by the memory controller.

The above-described configuration allows for data to be written into one of the memory modules in one of the memory units whose first module-side signal lines are connected by the first switch and data to read out from one of the memory modules in one of the memory units whose second module-side signal lines are connected by the second switch. Thus, by using the first and second switches, bank switching can be implemented with ease.

An alternative to the present invention as described above provides that the first and second controller-side signal lines are disconnected from the memory controller. Further a third switch is provided for connecting controller-side signal lines wired to the memory controller to the first controller-side signal lines wired to the first switch or the second controller-side signal lines wired to the second switch based on a third control signal generated by the memory controller.

Another alternative to the present invention as described above is that the first and second switches can each be set so as to place the first or second controller-side signal lines wired to the memory controller in a high-impedance state. In addition, a preferred connector is provided for removably holding a memory riser board of a memory unit on the base board so as to connect signal lines on the memory unit to signal-line wires on the base board.

The connector includes a connector box having an accepting mouth for accepting and firmly holding the memory riser board of the memory unit to be mounted on the connector. The accepting mouth has a shape adapted to the cross section of the memory riser board.

The connector further includes a first pin connected to one of two of the separated signal-line wires on the base board and extended from the base board to the accepting mouth,; and a second pin connected to the other of the two separated signal-line wires on the base board and extended from the base board to the accepting mouth.

When the memory riser board is not mounted, the first pin comes in contact with the second pin, thereby electrically connecting the two signal-line wires to each other. When the memory riser board is mounted, the first pin comes in contact with the signal line on the front surface of the memory riser board, thereby electrically connecting the first pin to the signal line on the front surface and the second pin comes in contact with the signal line on the back surface of the memory riser board, thereby electrically connecting the second pin to the signal line on the back surface.

By employing a connector with a configuration described above, even when the memory riser board is not mounted, a ring topology can be formed by the signal-line wires on the base board.

BRIEF DESCRIPTION OF THE DRAWINGS

The present invention will be more apparent from the following detailed description, when taken in conjunction with the accompanying drawings, in which.

DESCRIPTION OF THE PREFERRED EMBODIMENTS

Figure 1:
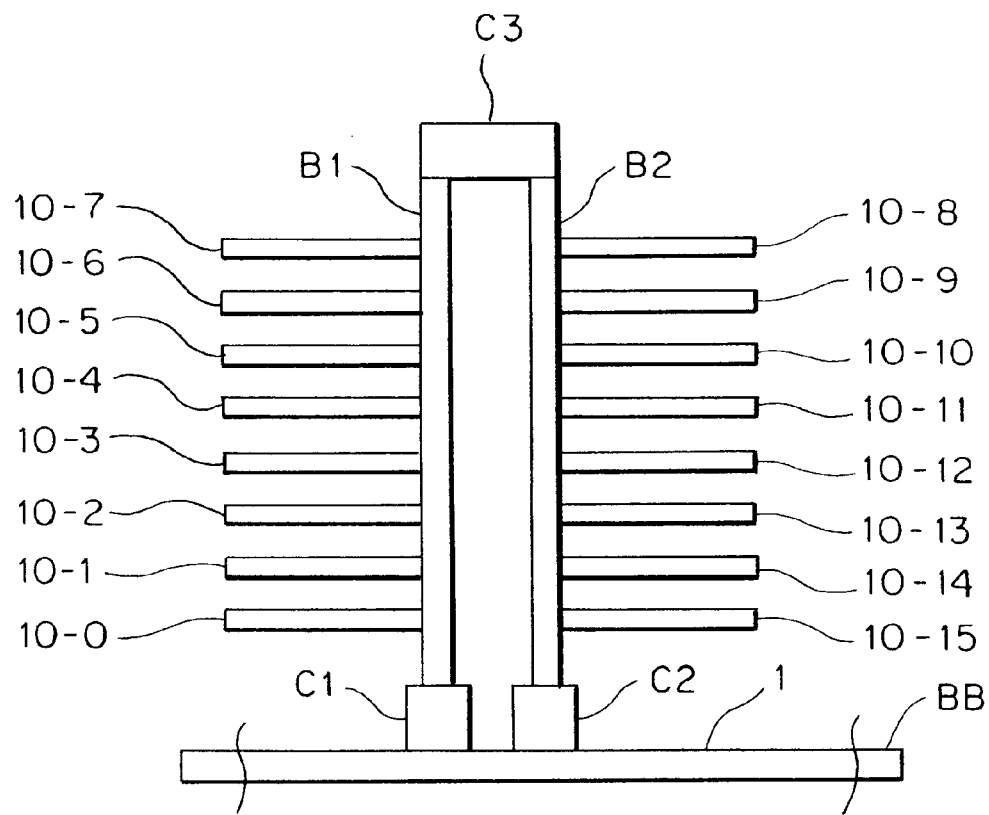
FIG. 1 is a diagram illustrating an external view and a rough configuration of a source-clock-synchronized memory system implemented by a first embodiment of the present invention.
Figure 2:
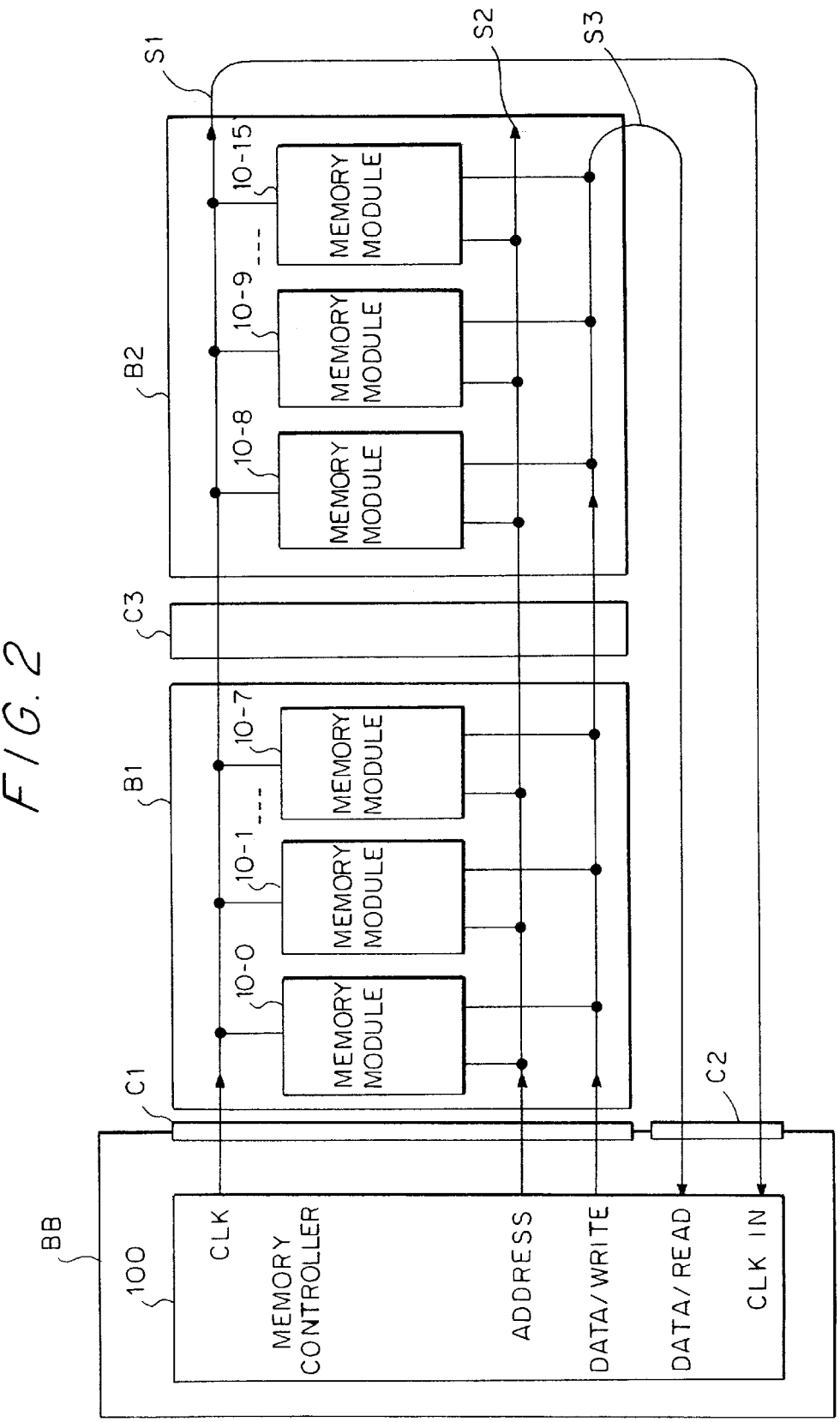
FIG. 2 is a block diagram illustrating the configuration of the source-clock-synchronized memory system implemented by the first embodiment.

The present invention will become more apparent from a study of the following detailed description of the preferred embodiments with reference to the accompanying diagrams. FIG. 1 is a diagram showing an external view of a source-clock-synchronized memory system implemented by a first embodiment of the present invention and FIG. 2 is a block diagram showing the configuration of the source-clock-synchronized memory system implemented by the first embodiment shown in FIG. 1.

Figure 20:
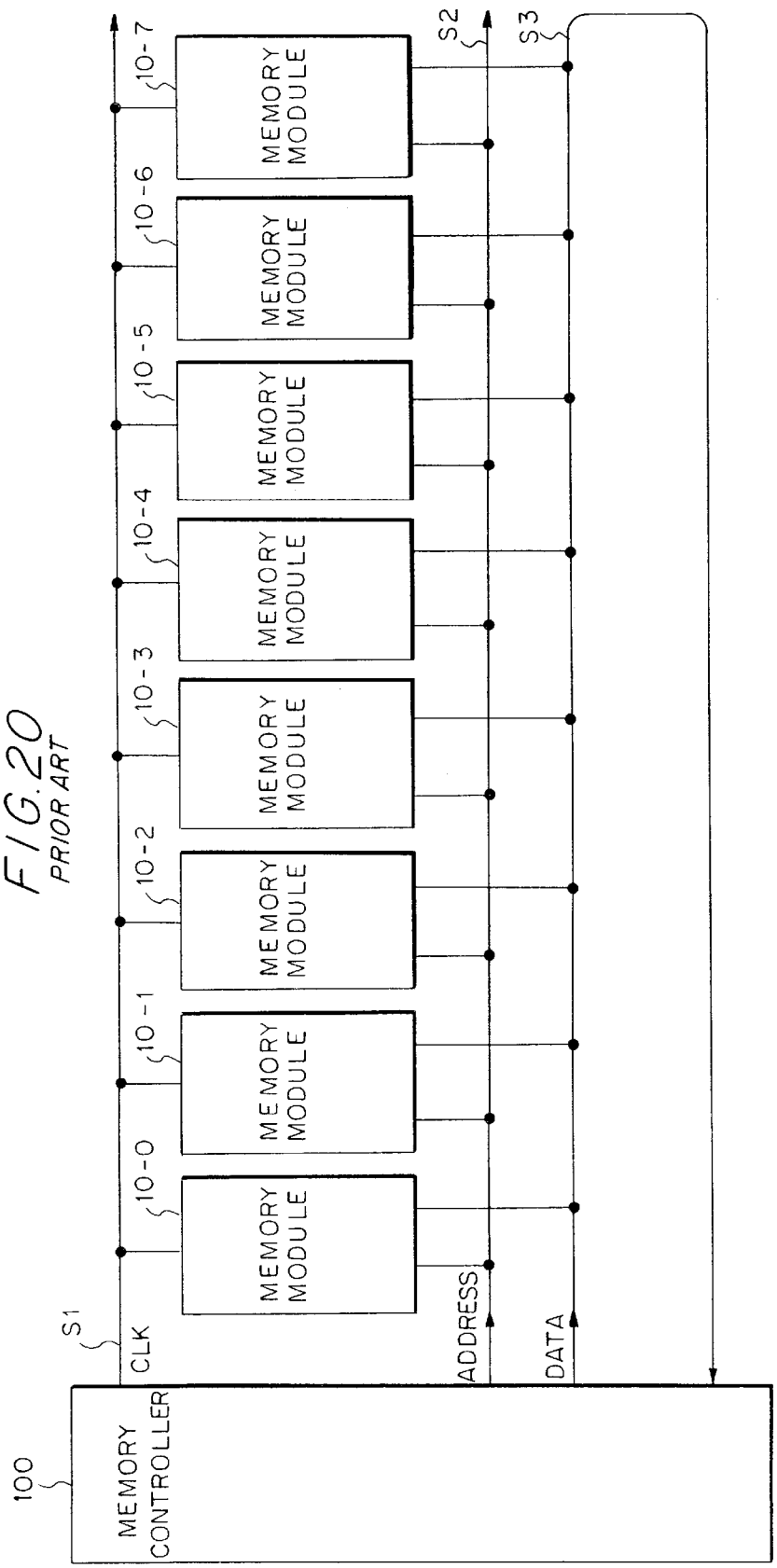
FIG. 20 is a diagram illustrating an external view and a rough configuration of a source-clock-synchronized memory system based on Ramlink.
Figure 21:
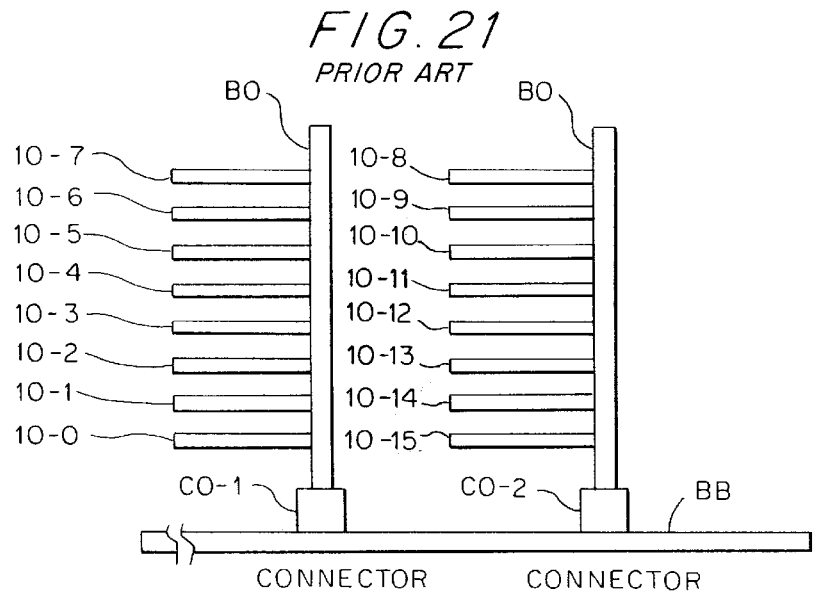
FIG. 21 is a diagram illustrating the configuration of the source-clock-synchronized memory system based on Ramlink.

Components employed in the source-clock-synchronized memory system shown in FIG. 1 identical with those shown in FIG. 21 are denoted by the same reference numerals used in the latter. By the same token, components employed in the source-clock-synchronized memory system shown in FIG. 2 identical with those shown in FIG. 20 are denoted by the same reference numerals. As shown in FIG. 1, the source-clock-synchronized memory system includes a base board BB, a first memory riser board B1 erected vertically on a first connector C1 provided on the base board BB, a second memory riser board B2 erected vertically on a second connector C2 provided on the base board BB and a board linking connector C3 for connecting the first memory riser board B1 to the second memory riser board B2. As shown in FIG. 2, a memory controller 100 is provided on the base board BB as is the case with the conventional source-clock-synchronized memory system.

A plurality of memory modules 10-0 to 10-7 are provided on the first memory riser board B1 in the horizontal direction at predetermined fixed intervals. A plurality of memory modules 10-8 to 10-15 are also provided on the second memory riser board B2 in the horizontal direction at the predetermined fixed intervals. As shown in FIG. 1, the memory modules 10-0 to 10-7 are installed on the front surface of the first memory riser board B1. The memory modules 10-8 to 10-15 are installed on the front surface of the second memory riser board B2 in such a way that the second memory riser board B2 is provided in a back-to-back arrangement with the first memory riser board B1. The back surface of the first memory riser board B1 faces the back surface of the second memory riser board B2.

The memory modules 10-0 to 10-15 employed in the source-clock-synchronized memory system implemented by the present embodiment have the same functions. As shown in FIG. 1, however, it is the right edge of each of the memory modules 10-0 to 10-7 that is plugged into the first memory riser board B1. In the case of the memory modules 10-8 to 10-15, on the other hand, it is the left edge thereof that is plugged into the second memory riser board B2.

In addition, the memory modules 10-0 to 10-7 are installed on the first memory riser board B1 sequentially one module after another starting from the bottom of the first memory riser board B1. On the other hand, the memory modules 10-8 to 10-15 are installed on the second memory riser board B2 sequentially one module after another starting from the top of the second memory riser board B2.

As shown in FIG. 2, the connector C1 is used for passing on a clock (CLK) signal, address/command signals and data to be written from the memory controller 100 to the first memory riser board B1. On the first memory riser board B1, a clock line S1, an address/command line S2 and a data line S3 are stretched from their respective contact points on the connector C1, being wired to the memory modules 10-0 to 10-7 sequentially one module after another. The length of the clock line S1 from the connector C1 to each of the memory modules is all but equal to those of the address/command and data lines S2 and S3 from the connector C1 to the memory module.

The board linking connector C3 can have a stiff structure like an ordinary connector or can be flexible like a cable or a FPC (Flexible Printed Circuit). As an alternative, the board linking connector C3 can be composed of an FPC embedded in one of the memory riser boards and a connector provided on the other memory riser board.

On the second memory riser board B2, the clock line S1, the address/command line S2 and the data line S3 are stretched from their respective contact points on the board linking connector C3, being wired to the memory modules 10-8 to 10-15 sequentially one module after another. Much like the first memory riser board B1, the length of the clock line S1 on the second memory riser board B2 from the board linking connector C3 to each of the memory modules is all but equal to those of the address/command and data lines S2 and S3 from the board linking connector C3 to the memory module.

On the first memory riser board B1, the clock line S1 is stretched from its contact point on the connector C1, being wired to the memory modules 10-0 to 10-7 sequentially one module after another to a contact point on the board linking connector C3. By the same token, on the first memory riser board B1, the address/command line S2 and the data line S3 are stretched from their respective contact points on the connector C1, being wired to the memory modules 10-0 to 10-7 sequentially one module after another to contact points on the board linking connector C3.

On the second memory riser board B2, the clock line S1 is stretched from its contact point on the board linking connector C3, being wired to the memory modules 10-8 to 10-15 sequentially one module after another to a contact point on the connector C2. By the same token, on the second memory riser board B2, the data line S3 is stretched from its contact point on the board linking connector C3, and is wired to the memory modules 10-8 to 10-15 sequentially one module after another to a contact point on the second connector C2. The address/command line S2, stretched from its contact point on the board linking connector C3, is wired to the memory modules 10-8 to 10-15 sequentially one module after another, and is ended by a matching terminator.

The second connector C2 is connected to the clock line S1 for passing on the clock (CLK) signal to the memory controller 100. The second connector C2 is connected to the data line S3 on the reading side for forwarding data read out from a memory module to the memory controller 100. As shown in FIG. 2, the clock line S1 and the data line S3 are folded back, and drawn through a gap between the second memory riser board B2 and the second connector C2. It should be noted, however, that in actuality, there is no gap between the second memory riser board B2 and the second connector C2 as is obvious from FIG. 1.

The clock line S1, the address/command line S2 and the data line S3 are wired to the memory modules 10-0 to 10-15 by the same wiring implementation, at equal wire lengths and at equal wiring impedances.

The operation of the source-clock-synchronized memory system with a configuration described above is explained below. The sequence and timing of control signals such as the RAS (Row Address Strobe), CAS (Column Address Strobe) and CS (Chip Select) signals are prescribed in the timing of a memory access to a DRAM mounted on a memory module. Nevertheless, what is important in the present invention is differences in phase described as follows.

In a write-data operation, that is, in an operation to write data into the DRAM mounted on one of the memory modules 10, the clock and address signals are output from the memory controller 100 at the same time through the clock line S1 and the address/command line S2 respectively. If a set-up time is required in the address with respect to a pulse in the clock signal in the memory modules 10, however, a difference in phase between the clock and address signals is established in advance as an offset.

Likewise, the memory controller 100 also outputs data through the data line S3 with the same timing as the clock and address signals. If a set-up time is required in the data with respect to a pulse in the clock signal in the memory modules 10, however, then a difference in phase between the clock and data signals is established in advance as an offset.

The clock, address and data signals output by the memory controller 100 via the connector C1 propagate through the clock, address/command and data lines S1, S2 and S3 on the first memory riser board B1 respectively, maintaining the fixed offset phase differences up to their arrival at the memory modules 10. Since these three types of signal lines, that is, the clock, address/command and data lines S1, S2 and S3, have the same physical wiring implementation, an equal wire length and an equal impedance, the resulting waveforms are identical with each other and the resulting propagation delay times are also equal to each other as well. Thus, synchronization is not effected.

Also in a read-data operation, that is, in an operation to read out data from the DRAM mounted on one of the memory modules 10, the clock and address signals are output from the memory controller 100 at the same time through the clock line S1 and the address/command line S2 respectively.

Data is output from the DRAM mounted on a memory module specified by the address signal with lagging timing. That is to say, that the data is output by the DRAM after an access time Tac has lapsed since the arrival of the clock (CLK) signal at the DRAM of the memory module specified by the address signal. In general, in the case of an SDRAM operating at 100 MHz, the length of the access time Tac has a value in the range 4 ns to 10 ns. That is to say, the data is transmitted from the memory module after the access time Tac has lapsed.

Data output from one of the memory modules 10-0 to 10-7 arrives at the second connector C2 through the data line S3 by way of the board linking connector C3 and the second memory riser board B2. Data output from one of the memory modules 10-8 to 10-15 arrives directly at the second connector C2 through the data line S3. The data is then supplied to a read-data input pin Data/Read of the memory controller 100 through the second connector C2. It should be noted that, physically, data output by any of the memory modules 10 also arrives at a write-data output pin Data/Write of the memory controller 100 by way of the first connector C1 but the data arriving at the write-data output pin Data/Write has no logical meaning. It is needless to say that the signal lines are each ended by a matching terminator for preventing an electric wave from being reflected.

The read data, that is, data output by any of the memory modules 10, arrives at the memory controller 100 with lagging timing. That is to say, the data arrives at the memory controller 100 after a delay time has lapsed since the time the clock and address signals are transmitted by the memory controller 100. The delay time is independent of which memory module 10 outputs the data. This is because the sum of the propagation time of the clock signal along the clock line S1 or the address signal along the address/command line S2 and the propagation time of the data along the data line S3 is fixed regardless of which memory module 10 outputs the data.

In addition, the phase relation described above does not change irrespective of the number of memory modules 10 mounted on the first or second memory riser board B1 or B2. That is to say, the phase relation for only one memory module 10 installed on the first or second memory riser board B1 or B2 is the same as the phase relation for all eight memory modules 10 installed on the first or second memory riser board B1 or B2. As a result, since read data is latched by using a clock signal arriving at a CLKIN pin of the memory controller 100 after propagating from the memory controller 100 through the clock signal S1 by way of the first connector C1, the board linking connector C3 and the second connector C2, a difference in propagation delay time caused by a variation in number of mounted memory modules 10 can be eliminated. As a result, the timing design of read data of the memory controller 100 can be carried out with ease.

Figure 22:
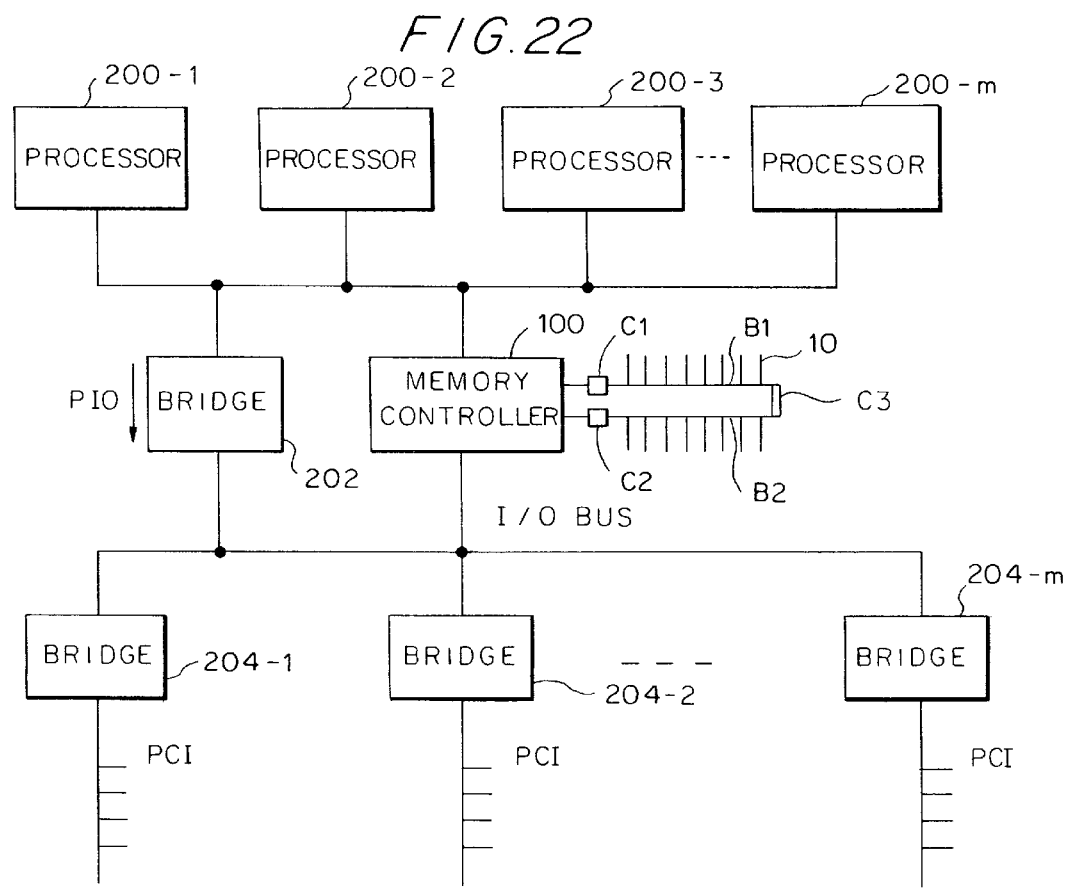
FIG. 22 is a block diagram illustrating a configuration of a source-clock-synchronization memory system implemented in an information processing system such as a server.

By configuring the source-clock-synchronized memory system in accordance with the present embodiment as described above, the number of memory modules connectable to one memory bus can be increased without reducing the propagation speed of signals along the bus and without making the timing design complicated. As a result, the data storage capacity of a memory that can be mounted on the entire system such as a computer can be increased, allowing the performance of the system as a whole to be enhanced. In particular, this effect is remarkable for a case such as a server system or an engineering workstation as illustrated in FIG. 22 and described below in which the data storage capacity of the memory directly contributes to the system performance.

Figure 3:
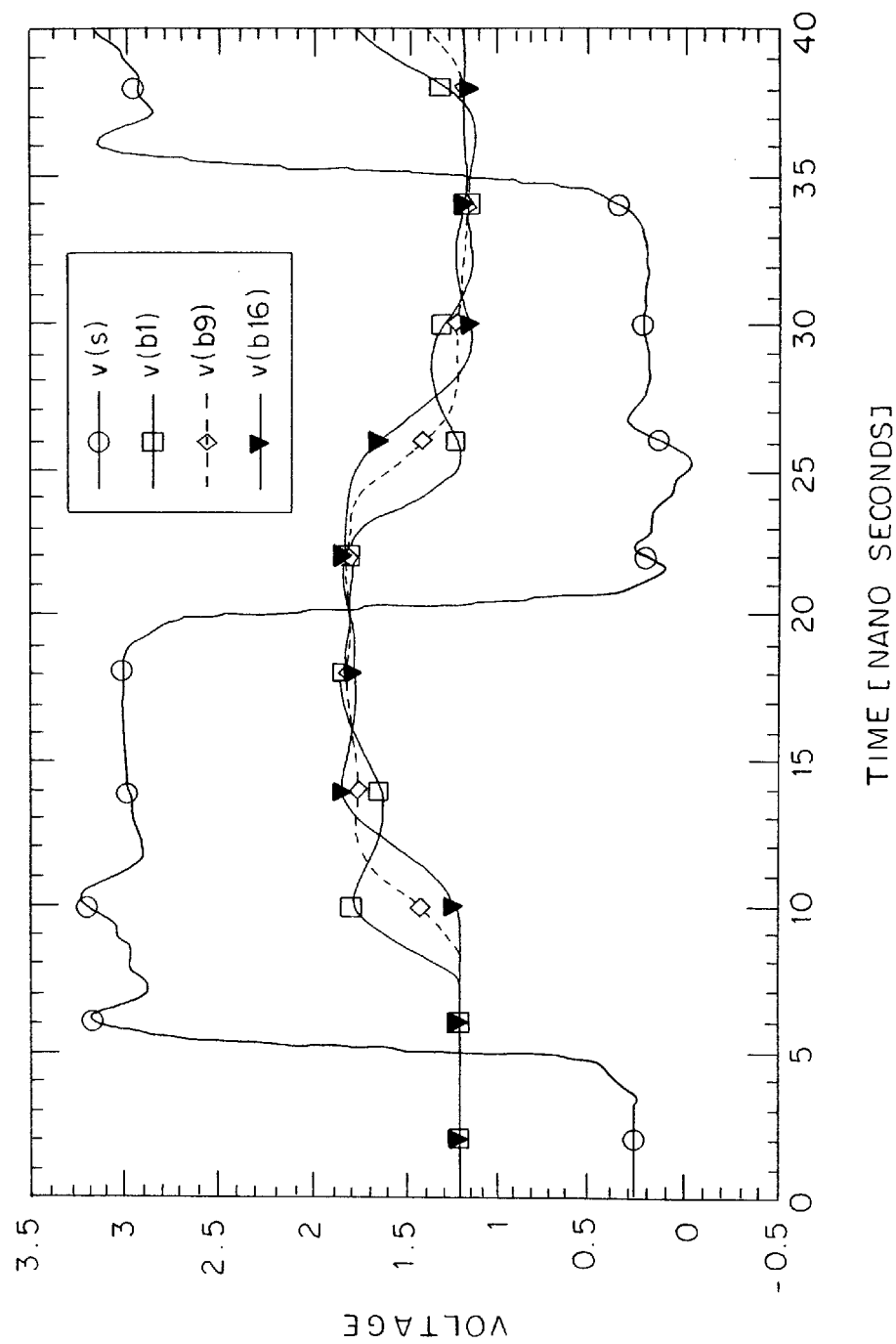
FIG. 3 is a diagram illustrating waveforms on an address bus resulting from SPICE simulation of the source-clock-synchronized system implemented by the first embodiment.
Figure 4:
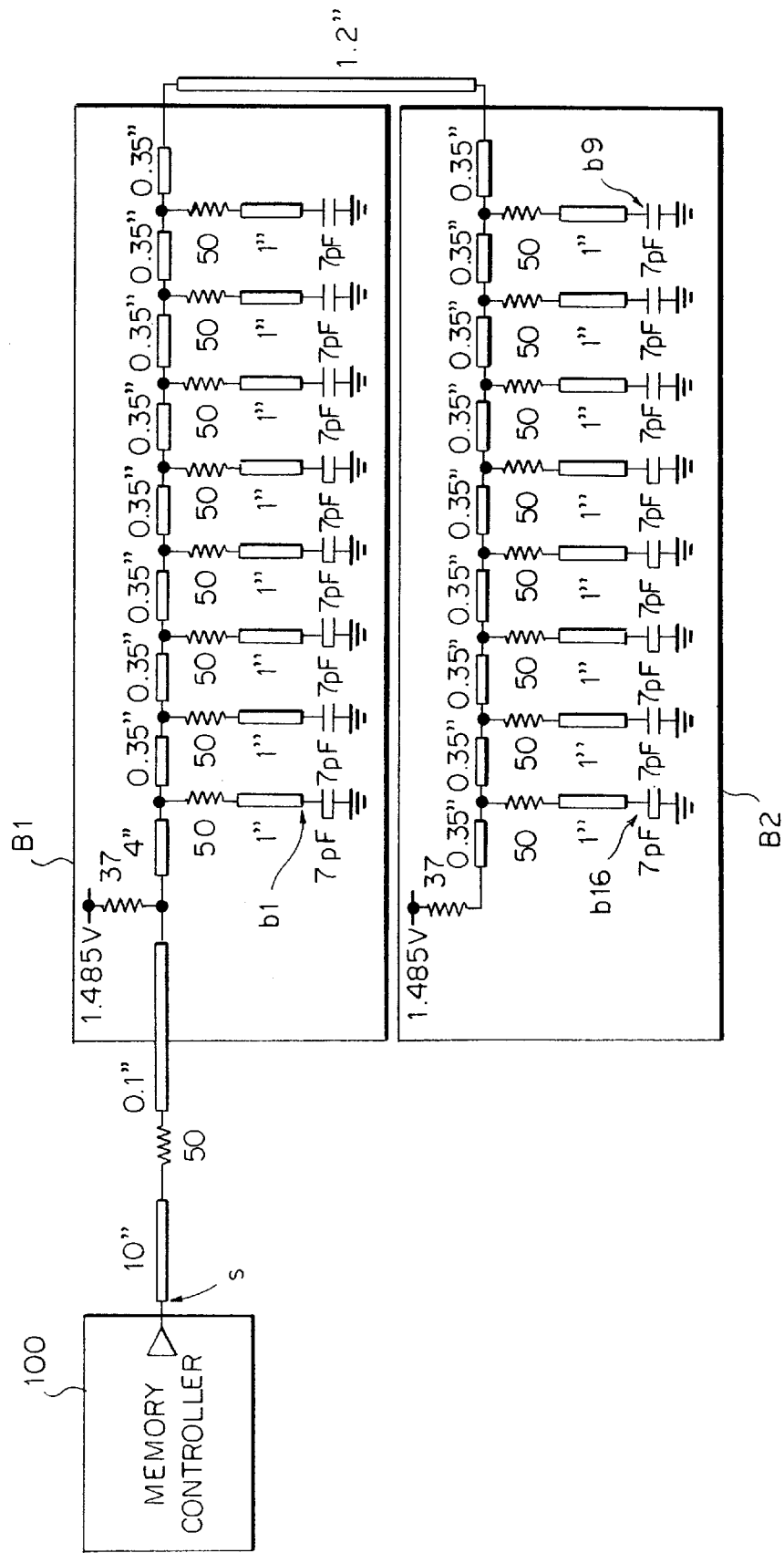
FIG. 4 is a diagram illustrating a simulation circuit used in the simulation of the source-clock-synchronized system implemented by the first embodiment.

FIG. 3 is a diagram showing waveforms on the address bus resulting from SPICE simulation of the source-clock-synchronized system implemented by the first embodiment, wherein eight memory modules are mounted on each or the first and second memory riser boards B1 and B2 by adopting SSTL (Stub Series Terminated Logic) in the interface of the memory bus. FIG. 4 is a diagram showing a simulation circuit used in the simulation.

Points of observation for producing the waveforms shown in FIG. 3 are an output point (S) of the memory controller, a memory pin (b1) of the first memory module 10-0, a memory pin (b9) of the ninth memory module 10-8 and a memory pin (b16) of the sixteenth memory module 10-15. The waveforms observed at the points of observation S, b1, b9 and b16 are denoted by notations v(S), v(b1), v(b9) and v(b16) in FIG. 3 respectively. As may be obvious from the FIG. 3, the waveforms observed at the points of observation are stable. In addition, it is also known that the operation of the memory can be carried out at a high speed because the signal waveforms are propagated through the signal line S1, S2 or S3 at the velocity of light. Furthermore, the propagation delay time of the signal is fixed and data can be transmitted with room in the noise margin.

According to the present embodiment, more memory riser boards, for example, memory riser boards twice as many as those of the conventional source-clock-synchronized memory system can be mounted without regard to the restriction imposed by the memory system box. As a result, the number of memory modules connectable to one memory bus can be increased.

Figure 5:
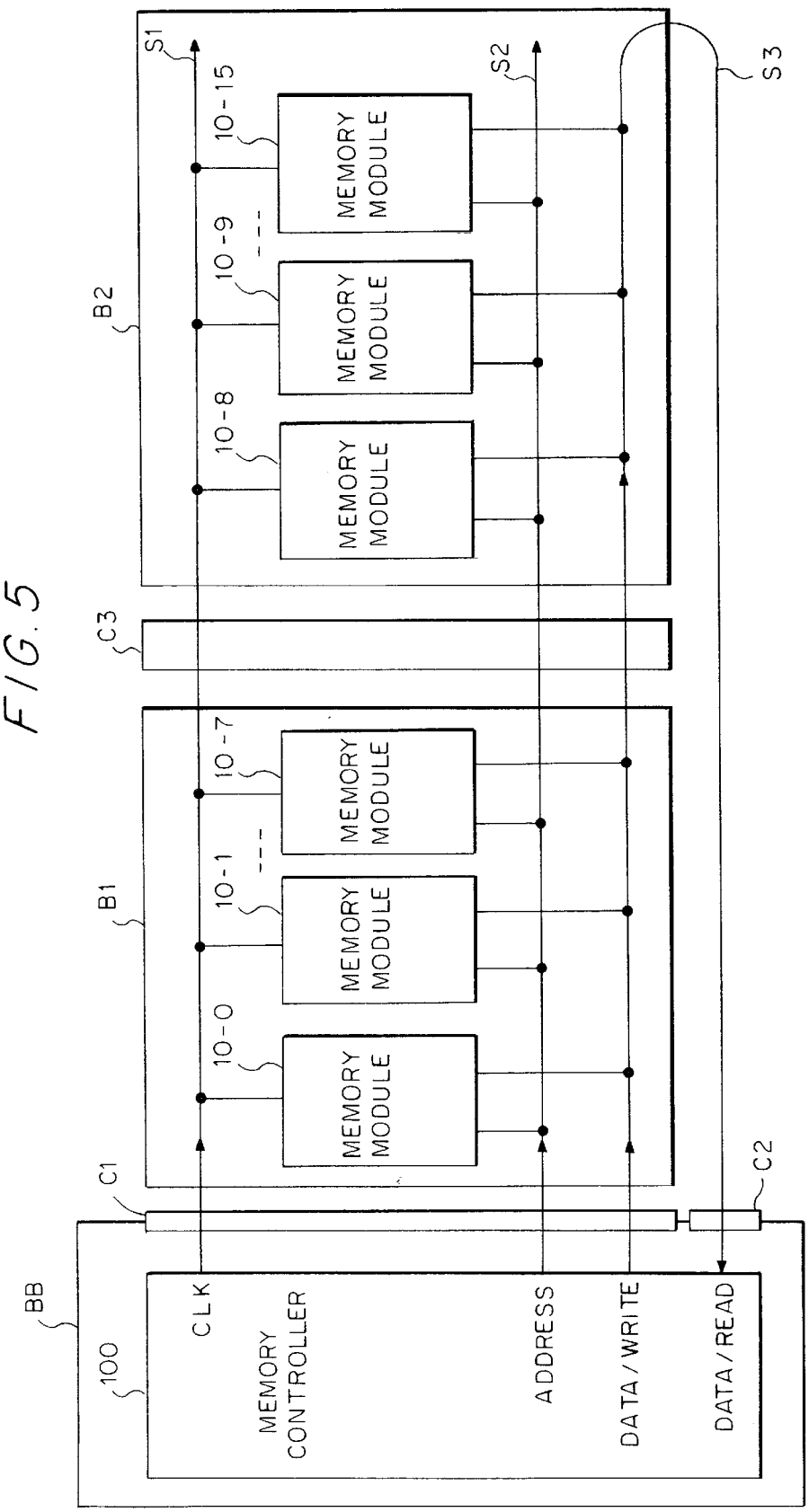
FIG. 5 is a block diagram illustrating the configuration of a source-clock-synchronized memory system implemented by a second embodiment of the present invention.

The following is description of a source-clock-synchronized memory system implemented by a second embodiment of the present invention with reference to FIG. 5. FIG. 5 is a block diagram showing the configuration of the source-clock-synchronized memory system implemented by the second embodiment. Components employed in the source-clock-synchronized memory system shown in FIG. 5 identical with those shown in FIG. 2 are denoted by the same reference numerals used in the latter. The external view of the source-clock-synchronized memory system implemented by the second embodiment is the same as that of the source-clock-synchronized memory system implemented by the first embodiment shown in FIG. 1.

The source-clock-synchronized memory system implemented by the second embodiment is different from the source-clock-synchronized memory system implemented by the first embodiment shown in FIG. 1. The second embodiment differs, much like the address/command line S2, the clock line S1 is stretched from its contact point on the first connector C1 through the first memory riser board B1, the board linking connector C3 and the second memory riser board B2 and is ended by a matching terminator on the second memory riser board B2 without being returned to the second connector C2 as shown in FIG. 5. In addition, in the case of the second embodiment, the access time of the DRAM, the propagation delay time of the transmission line and the skew are set at values about equal to a multiple or a fraction of the frequency of the memory controller 100 or the operating frequency.

Since the operation to write data into any of the memory modules 10-0 to 10-15 in the source-clock-synchronized memory system having a configuration described above is the same as that of the memory implemented by the first embodiment, its explanation is omitted. On the other hand, the operation to read out data from any of the memory modules 10-0 to 10-15 is explained as follows.

In an operation to read out data from the DRAM mounted on one of the memory modules 10, first of all, the clock and address signals are output from the memory controller 100 at the same time through the clock line S1 and the address/command line S2 respectively. Data is output from the DRAM mounted on a memory module specified by the address signal with lagging timing. That is to say, that the data is output by the DRAM after an access time Tac has lapsed since the arrival of the clock (CLK) signal at the DRAM of the memory module specified by the address signal.

Data output from one of the memory modules 10-0 to 10-7 arrives at the second connector C2 through the data line S3 by way of the board linking connector C3 and the second memory riser board B2. On the other hand, data output from one of the memory modules 10-8 to 10-15 arrives directly at the second connector C2 through the data line S3. The data is then supplied to a read-data input pin Data/Read of the memory controller 100 through the second connector C2.

As described above, the access time of the DRAM, the propagation delay time of the transmission line and the skew are set at values about equal to a multiple or a fraction of the frequency of the memory controller 100. Thus, data arriving at the read-data input pin Data/Read can be latched by using an internal clock signal of the memory controller 100. In detail, data is read out by using the internal clock signal of the memory controller 100. If the propagation time of the read data, that is, the sum of the access time, the propagation delay time of the transmission line and the skew is within the period of the clock signal, the data can be read out. In addition, since the read data can be latched by using the internal clock signal of the memory controller 100, it is not necessary to provide the memory controller 100 with an input pin for the clock signal. As a result, the configuration of an input circuit for reading out data from the memory in a read-data operation can be made simple.

According to the present embodiment, the mechanism for distributing the clock signal in the memory controller 100 becomes simple and the number of skews can be reduced, resulting in an increased operating margin. As a result, the stability of the system can be improved.

Figure 6:
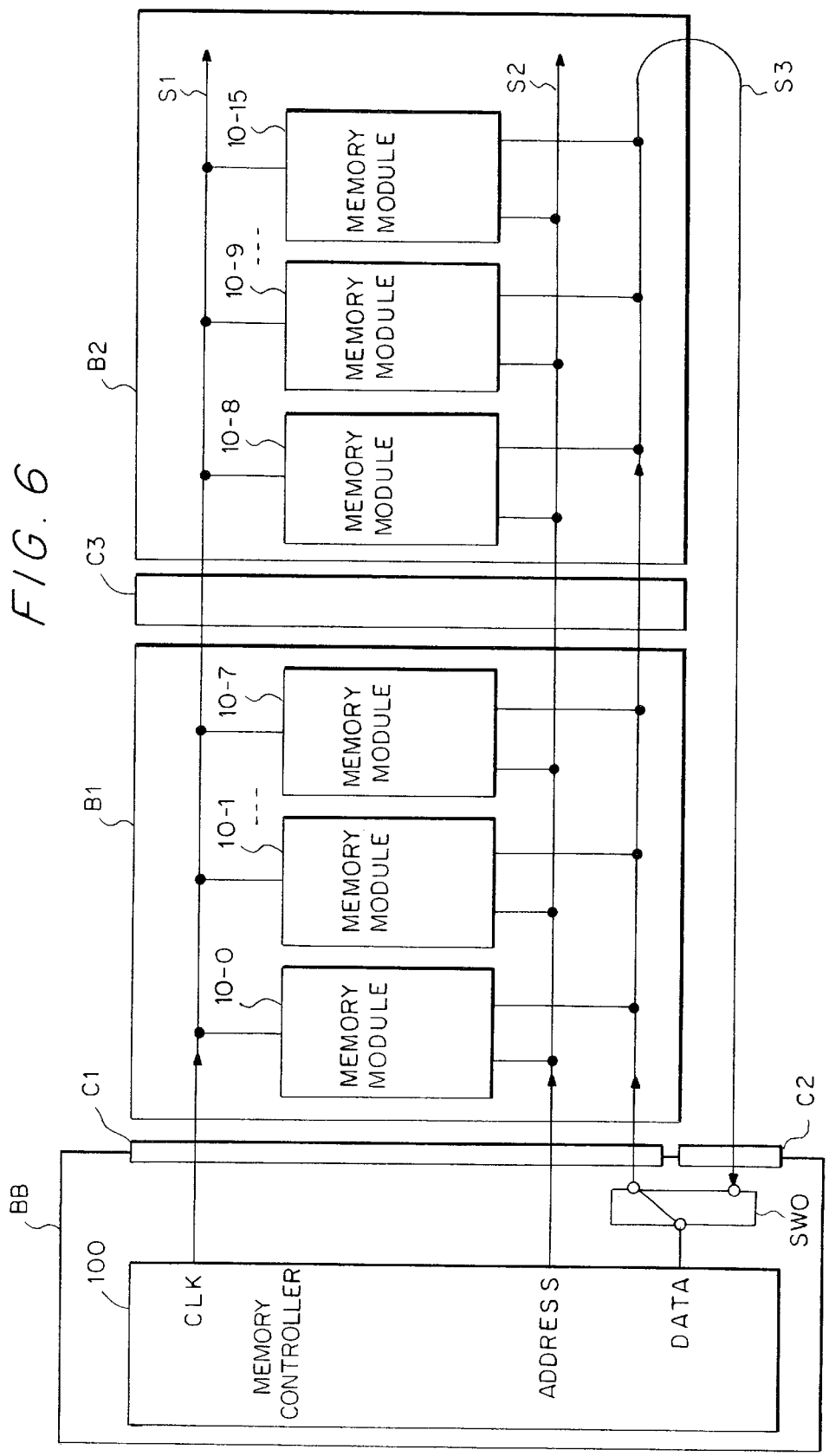
FIG. 6 is a block diagram illustrating the configuration of a source-clock-synchronized memory system implemented by a third embodiment of the present invention.

The following is description of a source-clock-synchronized memory system implemented by a third embodiment of the present invention with reference to FIG. 6. FIG. 6 is a block diagram showing the configuration of the source-clock-synchronized memory system implemented by the third embodiment. Components employed in the source-clock-synchronized memory system shown in FIG. 6 identical with those shown in FIG. 2 are denoted by the same reference numerals used in the latter. In addition, the external view of the source-clock-synchronized memory system implemented by the third embodiment is the same as that of the source-clock-synchronized memory system implemented by the first embodiment shown in FIG. 1.

As shown in FIG. 6, the first and second connectors C1 and C2, the first and second memory riser boards B1 and B2 as well as the board linking connector C3 employed in the source-clock-synchronized memory system implemented by the present embodiment are the same as those of the second embodiment. In the memory controller 100, however, a data input/output common pin Data is used in place of the write-data output pin Data/Write and the read-data input pin Data/Read. In addition, on the base board BB, there is provided a switch SW0 for connecting the data input/output common pin Data to either the data line of the first connector C1 or the data line of the second connector C2. That is to say, the present embodiment is characterized in that the switch SW0 is switched in transitions from a write cycle to a read cycle or vice versa in accordance with a control signal generated by the memory controller 100. It should be noted that the control signal itself is not shown in the FIG. 6.

It is obvious that the switch SW0 can be implemented by a channel between the drain and the source of an FET (Field-Effect transistor) or, as an alternative, a switch of another type such as a mechanical switch like a relay can also be employed. It is desirable to have a switch SW0 with a signal propagation delay time shorter than 0.1 to implement high-speed operations. It should be noted that, in general, data read out from any of the memory modules 10-0 to 10-15 is delayed from a read request, a request to read out the data, by a delay time of at least 30 ns. During the delay time, the memory controller 100 can form a judgment as to whether the current cycle is a write or read cycle. The outcome of the judgment is used for determining a state in the switch SW0. Therefore, the switching of the switch SW0 is not carried out with critical timing.

In an operation to write data into any of the memory modules 10-0 to 10-15 employed in the source-clock-synchronized memory system having a configuration described above, the switch SW0 is actuated to connect the data input/output common pin Data to the data line S3 of the first connector C1, allowing the clock signal, the address signal and data to be output from the memory controller 100 at the same time through the clock line S1, the address line S2 and the data line S3 respectively. Operations carried out thereafter are the same as those of the first embodiment. That is to say, the clock signal, the address signal and the data output from the memory controller 100 via the connector C1 propagate through the clock, address/command and data lines S1, S2 and S3 on the first memory riser board B1 respectively, maintaining the fixed offset phase differences up to their arrival at the memory modules 10. In this way, data is written into a desired memory module.

In an operation to read out data from the DRAM mounted on one of the memory modules 10, on the other hand, the clock and address signals are output from the memory controller 100 at the same time through the clock line S1 and the address/command line S2 respectively. At that time, the switch SW0 is actuated to connect the data input/output common pin Data to the data line S3 of the second connector C2. It should be noted that, if necessary, the switch SW0 can be actuated before the assertion of the clock and address signals on the clock line S1 and the address/command line S2 respectively. The data is output from the memory module specified by the address signal after an access time Tac has lapsed since the arrival of the clock (CLK) signal at the memory module.

The data output by one of the memory modules 10-0 to 10-7 is transferred through the data line S3 to the second connector C2 by way of the board linking connector C3 and the second memory rise board B2. The address signal may specify one of the memory modules 10-8 to 10-15. In this case, the data output by one of the memory modules 10-8 to 10-15 is transferred directly to the second connector C2 through the data line S3. In either case, the data is passed on from the second connector C2 to the data input/output common pin Data of the memory module 100 by way of the switch SW0.

Also in the case of the third embodiment, the access time of the DRAM, the propagation delay time of the transmission line and the skew are set at values about equal to a multiple or a fraction of the frequency of the memory controller 100 as is the case with the second embodiment. As a result, data arriving at the data input/output common pin Data can be latched by the memory controller 100.

According to the present embodiment, the number of terminals (pins) for the data signal in the memory controller 100 can be reduced by about half. Assume that the width of the data is eight bytes. In this case, if the terminals for data to be written into a memory module are provided separately from the terminals for data read out from a memory module, 128 pins for the data signal and about 64 ground pins for return currents or a total of approximately 192 pins are required in the memory controller 100. In the case of the memory controller 100 provided by the present embodiment, on the other hand, only 86 pins or half the above total number are sufficient in addition to only a pin for supplying a control signal from the memory controller 100 to the switch SW0. Thus, the size of the package for the memory controller 100 which is normally implemented as a single LSI can be reduced substantially. As a result, the cost of the memory controller 100 can also be decreased as well. It should be noted that, for reference, the number of ground pins is computed by assuming that the ratio of the signal count to the return-current count is 2:1. The ratio is determined by the rise time of the signal, the amount of simultaneous driving noise of the LSI package and the allowable amount of the noise. In the case of QFP and PGA packages, the ratio is normally about 2:1.

Figure 7:
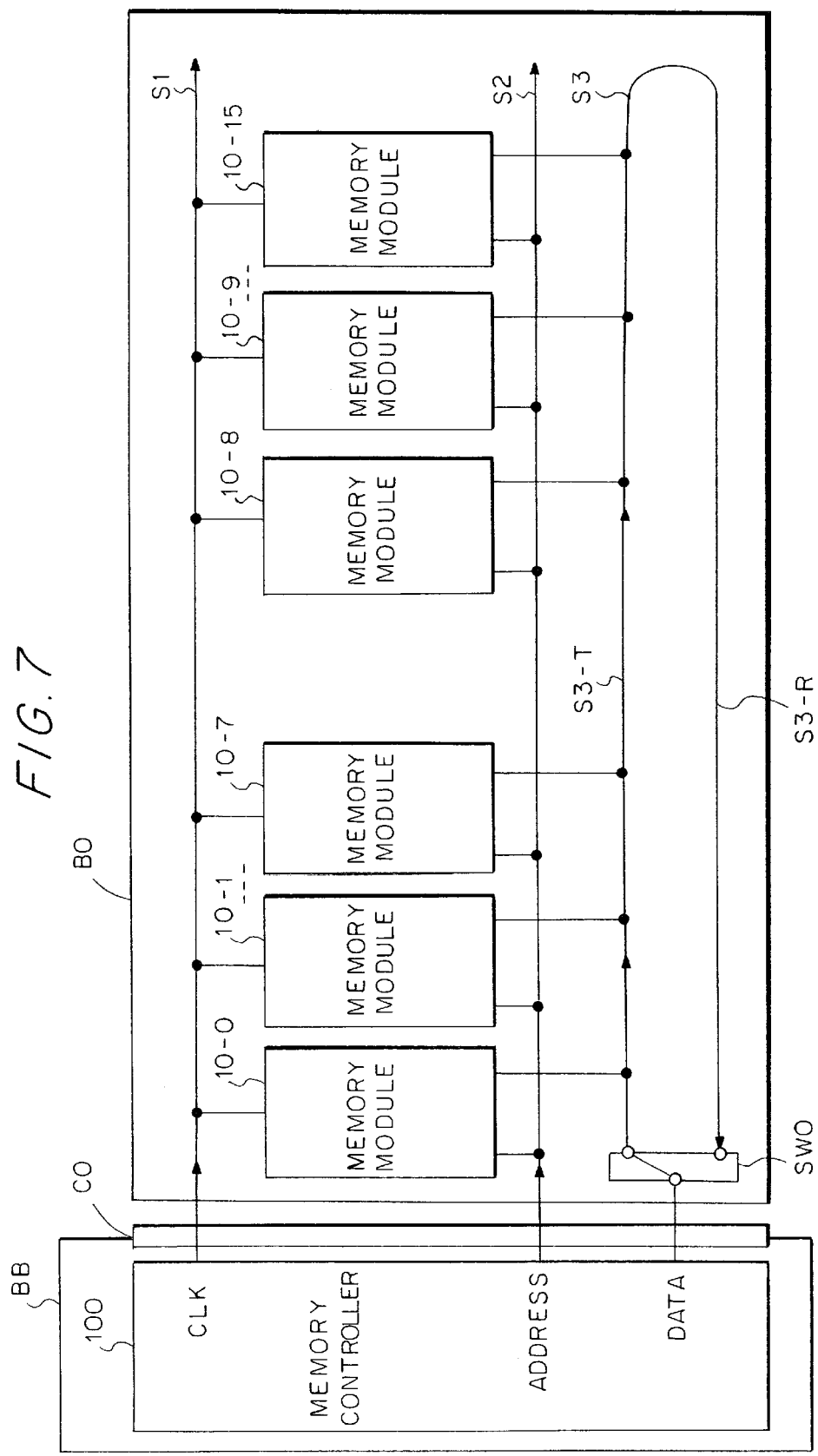
FIG. 7 is a block diagram illustrating the configuration of a source-clock-synchronized memory system implemented by a fourth embodiment of the present invention.

The following is description of a source-clock-synchronized memory system implemented by a fourth embodiment of the present invention with reference to FIG. 7.

FIG. 7 is a block diagram showing the configuration of the source-clock-synchronized memory system implemented by the fourth embodiment. Components employed in the source-clock-synchronized memory system shown in FIG. 7 identical with those shown in FIGS. 2, 5 and 6 are denoted by the same reference numerals used in the latter. In addition, the external view of the source-clock-synchronized memory system implemented by the fourth embodiment is the same as that of the conventional source-clock-synchronized memory system shown in FIG. 21.

As shown in FIG. 7, the source-clock-synchronized memory system implemented by the fourth embodiment comprises a base board BB, a memory controller 100 provided on the base board BB, a connector C0 and a memory riser board B0. In the memory controller 100, a data input/output common pin Data is used in place of the write-data output pin Data/Write and the read-data input pin Data/Read as is the case with the third embodiment. In addition, on the memory riser board B0, there is provided a switch SW0. Much like the third embodiment, the switch SW0 is controlled by a control signal generated by the memory controller 100. It should be noted that the control signal itself is not shown in the figure. The switch SW0 is used for connecting the data input/output common pin Data of the memory controller 100 on the base board BB to either a data line S3-T serving as a transmission line for data or a data line S3-R which is used as a return line for the data on the memory riser board B0 in accordance with the control signal generated by the memory controller 100. The connector C0 is connected to the clock line, the address/command line, the data line and the control line for switch SW0.

The source-clock-synchronized memory system implemented by the present embodiment operates in all but the same way as the third embodiment. In an operation to write data into any of the memory modules 10-0 to 10-15 employed in the source-clock-synchronized memory system provided by the fourth embodiment, the switch SW0 is actuated to connect the data input/output common pin Data to the data line S3-T which serves as a data transmission line, allowing the clock signal, the address signal and data to be output from the memory controller 100 at the same time through the clock line S1, the address line S2 and the data line S3 respectively. The clock signal, the address signal and the data output from the memory controller 100 via the connector C0 propagate through the clock, address/command and data lines S1, S2 and S3 on the memory riser board B0 respectively, maintaining the fixed offset phase differences up to their arrival at the memory modules 10. In this way, data is written into a desired memory module.

In an operation to read out data from the DRAM mounted on one of the memory modules 10, on the other hand, the clock and address signals are output from the memory controller 100 at the same time through the clock line S1 and the address/command line S2 respectively. At that time, the switch SW0 is actuated to connect the data input/output common pin Data to the data line S3-R which serves as a data return line. It should be noted that, if necessary, the switch SW0 can be actuated before the assertion of the clock and address signals. The data is output from the memory module specified by the address signal after an access time Tac has lapsed since the arrival of the clock (CLK) signal at the memory module. The data output by one of the memory modules 10-0 to 10-15 is transferred through the data line S3-R, the switch SW0 and the connector C0 to the data input/output common pin Data of the memory module 100. According to the present embodiment, the number of pins of the connector C0 for connecting the data signals of the memory controller 100 on the base board BB to the memory riser board B0 can be reduced.

Assume that the width of the data of the memory modules 10-0 to 10-15 isn read out by said image read-out means attached with the corresponding unique number. pins for the signal line and several ground pins for return currents of the signal line. If the number of ground pins is computed by assuming that the ratio of the signal count to the return-current count is 2:1, 64 ground pins are required. Thus, the connector C0 requires a total of approximately 192 pins. In the case of the present embodiment, on the other hand, only 86 pins or half the above total number are sufficient. The only pin to be added is a pin for supplying a control signal from the memory controller 100 to the switch SW0. As a result, the cost of the connector C0 can be reduced. In addition, the space for installing the connector C0 can also be made smaller as well. Furthermore, the number of pins provided on the memory controller 100 can be reduced as is the case with the third embodiment.

Figure 8:
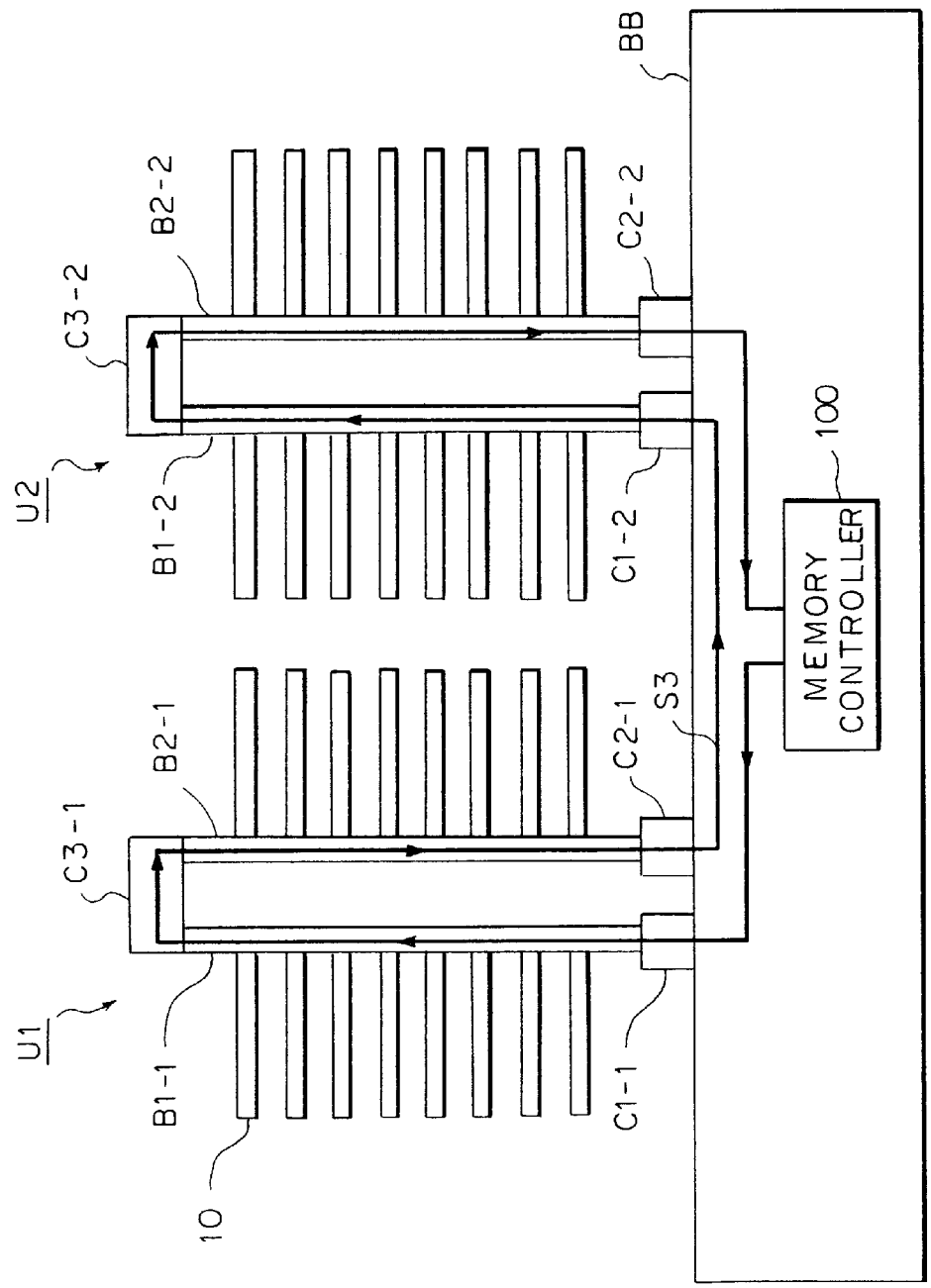
FIG. 8 is a diagram illustrating an external view and a rough configuration of a source-clock-synchronized memory system implemented by a fifth embodiment of the present invention.

The following is description of a source-clock-synchronized memory system implemented by a fifth embodiment of the present invention with reference to FIG. 8. FIG. 8 is a block diagram showing the configuration of the source-clock-synchronized memory system implemented by the fifth embodiment. As shown in FIG. 8, the source-clock-synchronized memory system implemented by the fifth embodiment includes a base board BB, a memory controller 100 provided on the base board BB and two memory-module assembly units U1 and U2 which each includes a couple of memory riser boards B1 and B2, a couple of connectors C1 and C2 as well as a board linking connector C3. Much like the embodiments described so far, the memory riser board B1 and B2 are each used for mounting a plurality of memory modules 10. To be more specific, the first memory-module assembly unit U1 includes the first memory riser board B1-1 for mounting eight memory modules 10, the first connector C1-1 for connecting the first memory riser board B1-1 to the base board BB, the second memory riser board B2-1 for mounting eight memory modules 10, the second connector C2-1 for connecting the second memory riser board B2-1 to the base board BB and the first board linking connector C3-1 for connecting the first and second memory riser boards B1-1 and B2-1 to each other. The second memory-module assembly unit U2 includes the first memory riser board B1-2 for mounting eight memory modules 10, the first connector C1-2 for connecting the first memory riser board B1-2 to the base board BB, the second memory riser board B2-2 for mounting eight memory modules 10, the second connector C2-2 for connecting the second memory riser board B2-2 to the base board BB and the second board linking connector C3-2 for connecting the first and second memory riser boards B1-2 and B2-2 to each other. In FIG. 8, only the data line S3 is shown schematically. Arrows on the data line S3 indicate propagation directions of data.

Figure 9:
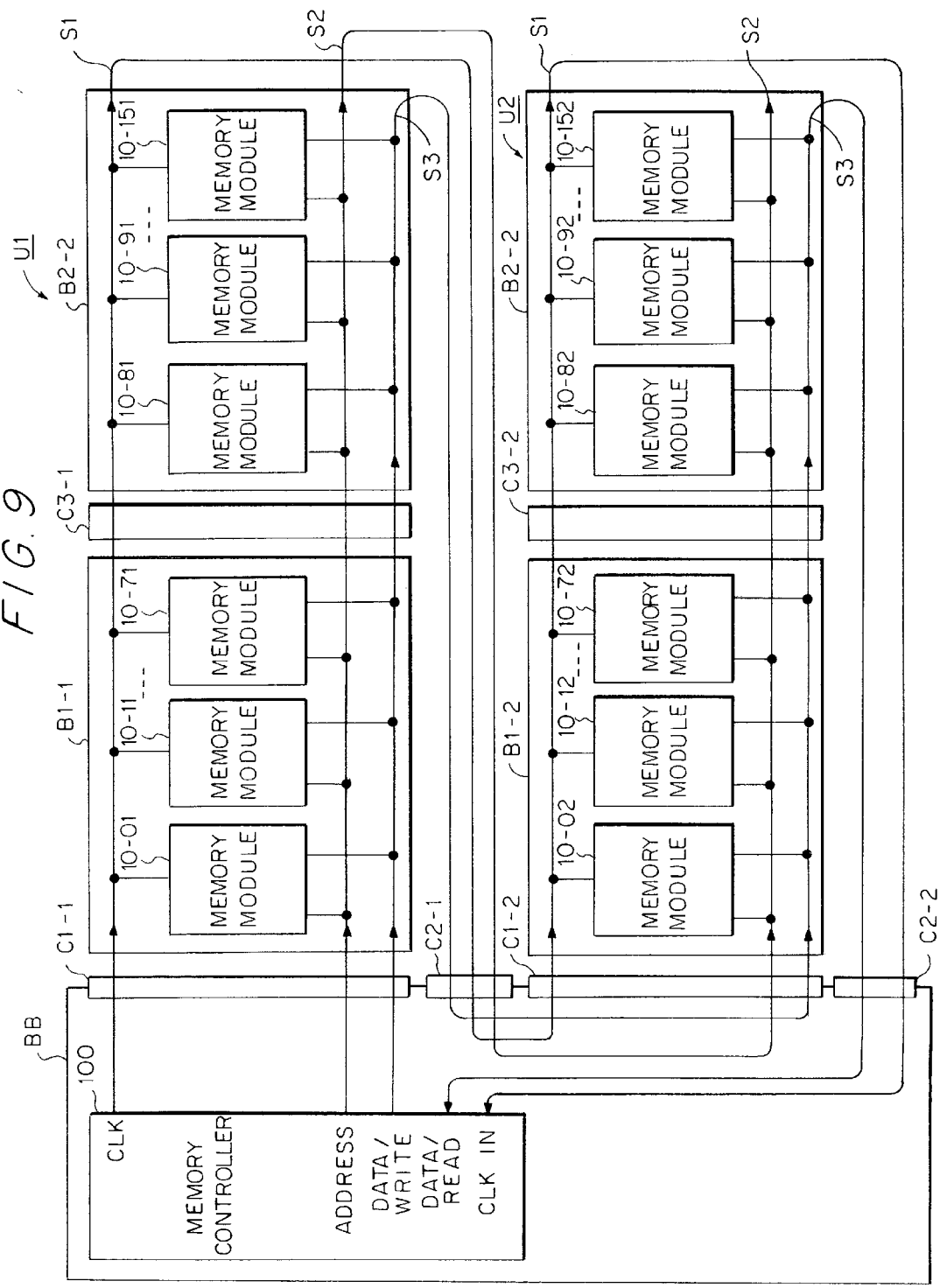
FIG. 9 is a block diagram illustrating the configuration of the source-clock-synchronized memory system implemented by the fifth embodiment.

FIG. 9 is a block diagram showing the configuration of the source-clock-synchronized memory system implemented by the fifth embodiment. As shown in FIG. 9, the first and second memory-module assembly units U1 and U2 each employ the first and second memory riser boards B1 and B2, the first and second connectors C1 and C2 and the board linking connector C3 which are identical with those of the first embodiment shown in FIG. 2. On the base board BB, signal lines from the second connector C2-1 of the first memory-module assembly unit U1 to the first connector C1-2 of the second memory-module assembly unit U2 are provided. A clock line S1, an address/command line S2 and a write-data line S3 from a memory controller 100 on the base board BB are connected to the first connector C1-1 of the first memory-module assembly unit U1. On the other hand, a read-data line S3 and an input-clock line S1 from the second connector C2-2 of the second memory-module assembly unit U2 are connected to a read-data input pin Data/Read and a clock input pin CLKIN of the memory controller 100 respectively.

As is clear from FIGS. 8 and 9, the clock line S1 is stretched from the memory controller 100 to the first memory riser board B1-1 of the first memory-module assembly unit U1 by way of the first connector C1-1 thereof, and is wired to the memory modules 10-01 to 10-71 provided on the first memory riser board B1-1 sequentially one module after another. The clock line S1 is further stretched from the first memory riser board B1-1 to the second memory riser board B2-1 of the first memory-module assembly unit U1 by way of the first board linking connector C3-1, and is wired to the memory modules 10-81 to 10-151 provided on the second memory riser board B2-1 sequentially one module after another. The clock line S1 is further stretched from the second memory riser board B2-1 to the base board BB by way of the second connector C2-1 of the first memory-module assembly unit U1. The clock line S1 is further stretched from the base board BB to the first memory riser board B1-2 of the second memory-module assembly unit U2 by way of the first connector C1-2 thereof, and is wired to the memory modules 10-02 to 10-72 provided on the first memory riser board B1-2 sequentially one module after another. The clock line S1 is further stretched from the first memory riser board B1-2 to the second memory riser board B2-2 of the second memory-module assembly unit U2 by way of the second board linking connector C3-2, and is wired to the memory modules 10-82 to 10-152 provided on the second memory riser board B2-2 sequentially one module after another. The clock line S1 is further stretched from the second memory riser board B2-2 to the base board BB by way of the second connector C2-2 of the second memory-module assembly unit U2, returning back to the memory controller 100 through the clock input pin CLKIN of the memory controller 100.

The data line S3 from the memory controller 100 returns back thereto through the same route as the clock line S1. The address/command line S2 from the memory controller 100 has all but the same route as the clock line S1 except that it is ended by a matching terminator after being wired to the memory modules 10-82 to 10-152 provided on the second memory riser board B2-2 of the second memory-module assembly unit U2 sequentially one module after another. It should be noted that the clock line S1, the address/command line S2 and the data line S3 are wired to the memory modules 10 by the same wiring implementation, at equal wire lengths and at equal wiring impedances.

The source-clock-synchronized memory system having the configuration described above operates in all but the same way as the first embodiment. In an operation to write data into the DRAM mounted on one of the memory modules 10, for example, the clock and address signals are output from the memory controller 100 at the same time through the clock line S1 and the address/command line S2 respectively. Data is output by using the data line S3 with timing identical with the clock and address signals. If a set-up time is required in the address signal or data with respect to a pulse in the clock signal in the memory modules 10, then a difference in phase between the clock and address signals or between the clock signal and the data is established in advance as an offset as is the case with the first embodiment. The clock signal, the address signal and data output by the memory controller 100 propagate through the clock, address/command and data lines S1, S2 and S3 respectively to the second connector C2-1 of the first memory-module assembly unit U1 by way of the first connector C1-1, the first memory riser board B1-1, the first board linking connector C3-1 and the second memory riser board B2-1 of the first memory-module assembly unit U1. The signals further propagate from the second connector C2-1 of the first memory-module assembly unit U1 to the second memory riser board B2-2 of the second memory-module assembly unit U2 by way of the base board BB, the first connector C1-2, the first memory riser board B1-2 and the second board linking connector C3-2 of the second memory-module assembly unit U2. It should be noted that since the clock line S1, the address/command line S2 and the data line S3 are wired to the memory modules 10 of the first and second memory-module assembly units U1 and U2 by the same wiring implementation, at equal wire lengths and at equal wiring impedances, the clock signal, the address signal and data arrive at the memory modules by maintaining the fixed offset phase differences. In this way, data can be written into the DRAM of a desired memory module as is the case with the first embodiment.

In an operation to read out data from the DRAM of one of the memory modules, on the other hand, the clock and address signals are output from the memory controller 100 at the same time through the clock line S1 and the address/command line S2 respectively. The signals propagate along the signal lines on the memory riser boards B1-1, B2-1, B1-2 and B2-2 by way of the connectors C1-1, C3-1, C2-1, C1-2 and C3-2.

Data is output from the DRAM of a memory module specified by the address signal, being destined finally to the read-data input pin Data/Read of the memory controller 100 through the data line S3 by way of the second connector C2-2 of the second memory-module assembly unit U2 after an access time Tac (seconds) has lapsed since the arrival of the clock signal at the DRAM. The clock signal further propagates from the second memory riser board B2-2 of the second memory-module assembly unit U2 to the clock input pin CLKIN of the memory controller 100 through the clock line S1 by way of the second connector C2-2 of the second memory-module assembly unit U2.

As a result, the data arriving at the read-data input pin Data/Read of the memory controller 100 can be latched by the clock signal supplied to the memory controller 100 through the clock input pin CLKIN.

According to the present embodiment, by providing a plurality of memory-module assembly units each includes a couple of memory riser boards and a board linking connector, the number of memory modules mountable in one memory bank of the memory system, that is, the data storage capacity per memory-system bank can be increased.

It should be noted that, since the propagation paths of the clock, address/command and data lines become longer, the waveforms may be weakened. In such a case, a bus driver or a bus driver with a latch can be provided on the propagation path of each of the lines. The bus drivers for the lines are provided at locations at an equal distance from the memory controller 100. For example, the bus drivers can be provided at a location on the base board BB on the downstream side of the second connector C2-1 of the first memory-module assembly unit U1.

Figure 10:
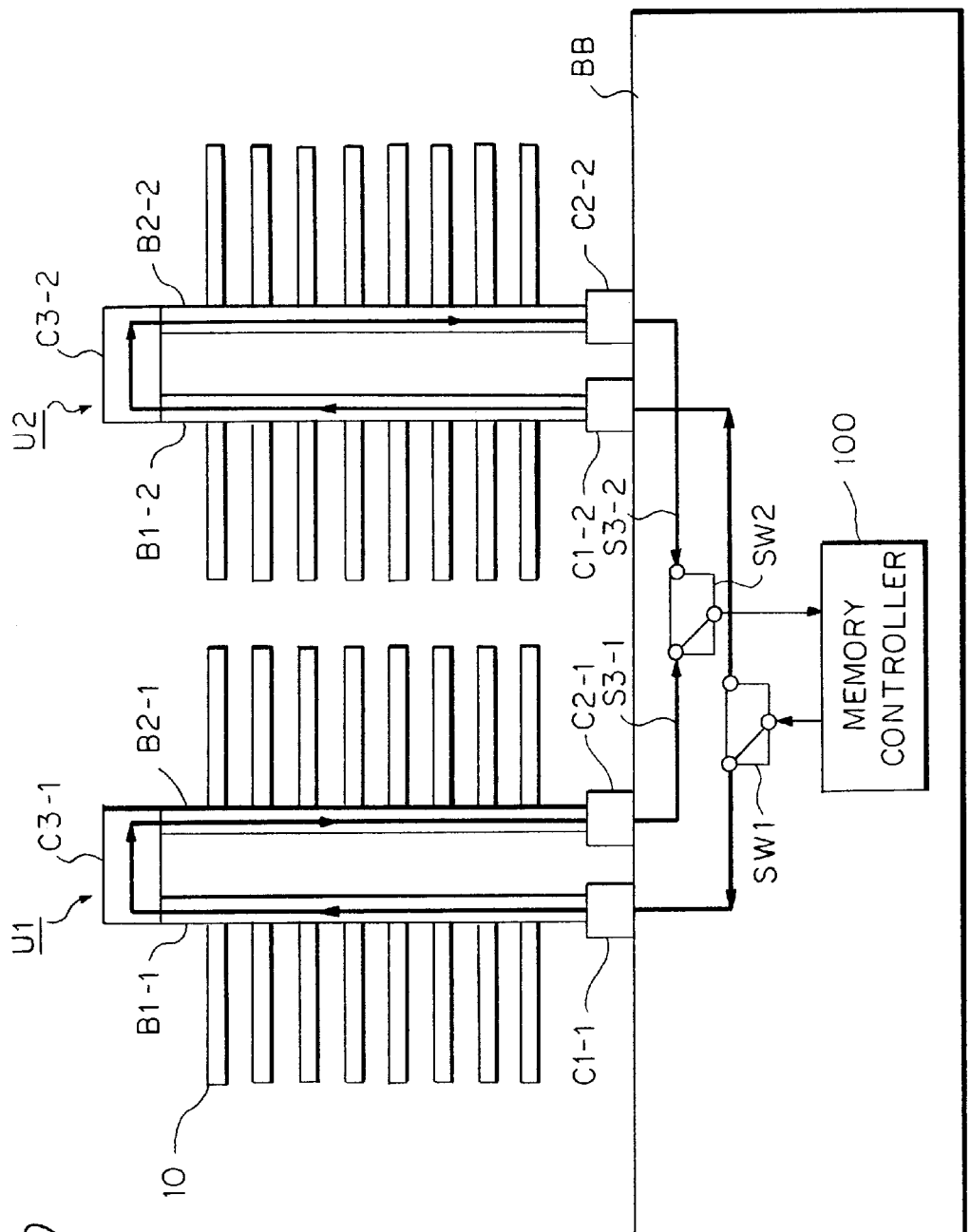
FIG. 10 is a diagram illustrating an external view and a rough configuration of a source-clock-synchronized memory system implemented by a sixth embodiment of the present invention.

The following is description of a source-clock-synchronized memory system implemented by a sixth embodiment of the present invention with reference to FIG. 10. FIG. 10 is a diagram showing the source-clock-synchronized memory system implemented by the sixth embodiment. In the case of the present embodiment, by employing two switches SW1 and SW2 for switching the system from one memory bank to another, the read/write data storage capacity can be raised without increasing the number of terminals (pins) provided on the memory controller.

Figure 11:
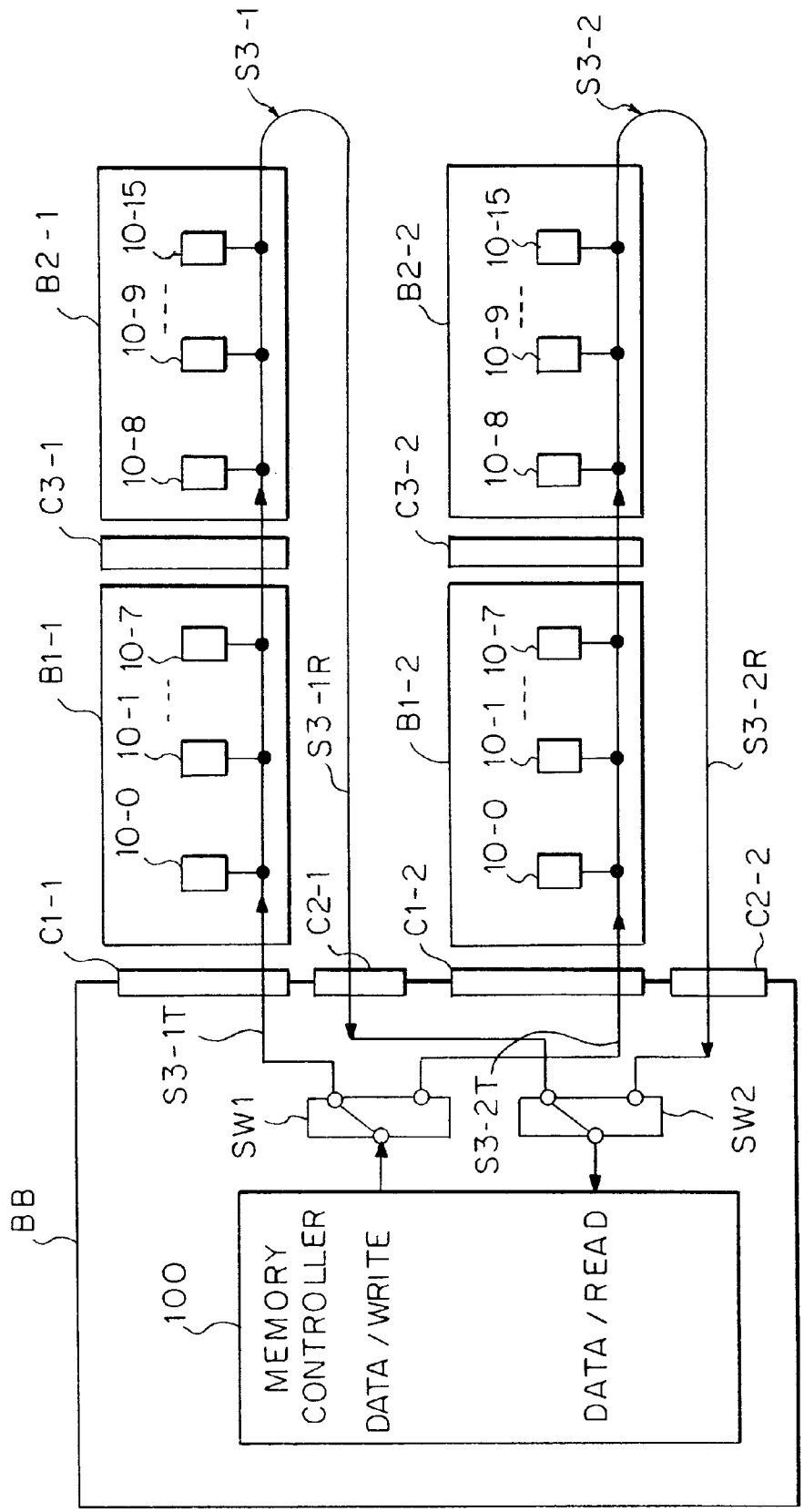
FIG. 11 is a block diagram illustrating the configuration of the source-clock-synchronized memory system implemented by the sixth embodiment.
Figure 12:
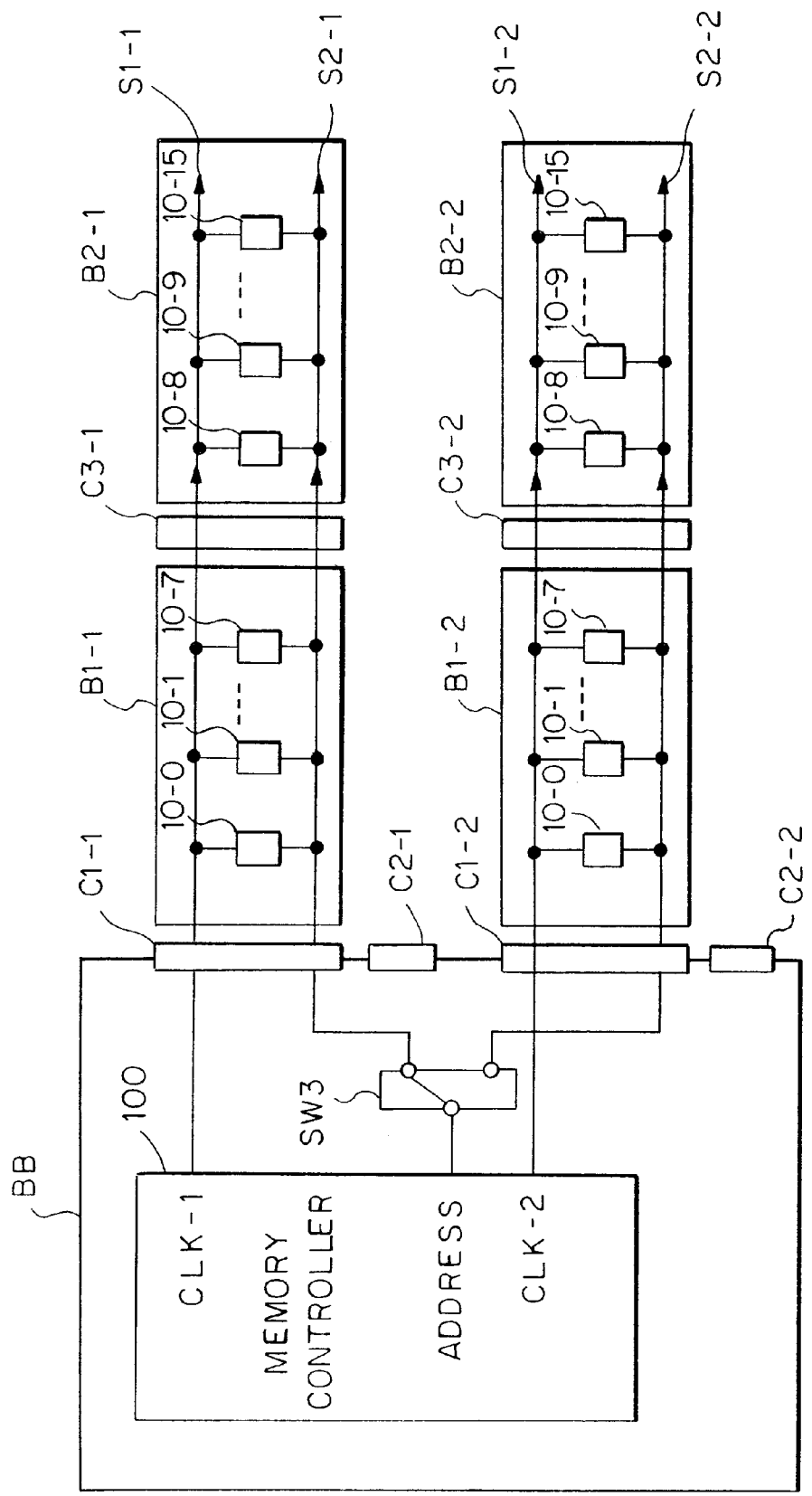
FIG. 12 is a block diagram illustrating the configuration of the source-clock-synchronized memory system implemented by the sixth embodiment, putting an emphasis on connection of clock and address/command lines.

As shown in FIG. 10, the source-clock-synchronized memory system implemented by the sixth embodiment includes first and second memory-module assembly units U1 and U2. The configurations of the first and second memory-module assembly units U1 and U2 are the same as those of the fifth embodiment shown in FIGS. 8 and 9. That is to say, the first memory-module assembly unit U1 includes the first memory riser board B1-1, the first connector C1-1, the second memory riser board B2-1, the second connector C2-1 and the first board linking connector C3-1. The second memory-module assembly unit U2 includes the first memory riser board B1-2, the first connector C1-2, the second memory riser board B2-2, the second connector C2-2 and the second board linking connector C3-2. In addition, switches SW1 and SW2 are provided on the base board BB. FIG. 11 is a block diagram showing the configuration of the source-clock-synchronized memory system implemented by the sixth embodiment, putting an emphasis on connection of a data line S3. FIG. 12 is a block diagram showing the configuration of the source-clock-synchronized memory system implemented by the sixth embodiment, putting an emphasis on connection of clock and address/command lines S1 and S2. In FIG. 11, the clock and address/command lines S1 and S2 are not shown while, in FIG. 12, the data line S3 is omitted.

As shown in FIGS. 10 and 11, the switch first SW1 provided on the base board BB is used for connecting a write data line wired to the write-data output pin Data/Write of the memory controller 100 to either the data line S3-1T serving as a transmission line on the first memory-module assembly unit U1 or the data line S3-2T serving as a transmission line on the second memory-module assembly unit U2 in accordance with a control signal generated by the memory controller 100. The second switch SW2 provided on the base board BB is used for connecting a read data line toward the read-data input pin Data/Read of the memory controller 100 to either the data line S3-1R serving as a return line on the first memory-module assembly unit U1 or the data line S3-2R serving as a return line on the second memory-module assembly unit U2 in accordance with another control signal generated by the memory controller 100. It should be noted that the control signals themselves are not shown in FIG. 11.

It is desirable to provide the first switch SW1 at such a location that the length of the data line stretched from the first switch SW1 to the first connector C1-1 on the first memory-module assembly unit U1 is equal to the length of the data line stretched from the first switch SW1 to the first connector C1-2 on the second memory-module assembly unit U2, and to provide the second switch SW2 at such a location that the length of the data line stretched from the second switch SW1 to the second connector C2-1 on the first memory-module assembly unit U1 is equal to the length of the data line stretched from the second switch SW2 to the second connector C2-2 on the second memory-module assembly unit U2. By providing the first and second switches SW1 and SW2 at such locations, the wire length of the data line to the first memory-module assembly unit U1 becomes equal to the wire length of the data line to the second memory-module assembly unit U2, making the timing design simple.

As shown in FIG. 12, a third switch SW3 is further provided on the base board BB. The third switch SW3 is used for connecting the address/command line wired to the address controller 100 to either the address/command line S2-1 on the first memory-module assembly unit U1 or the address/command line S2-2 on the second memory-module assembly unit U2 in accordance with a control signal generated by the memory controller 100. The control signal itself is not shown in FIG. 12. It is desirable to provide the third switch SW3 at such a location that the length of the address/command line stretched from the third switch SW3 to the first connector C1-1 on the first memory-module assembly unit U1 is equal to the length of the address/command line stretched from the third switch SW3 to the first connector C1-2 on the second memory-module assembly unit U2. By providing the third switch SW3 at such a location, the wire length of the address/command line to the first memory-module assembly unit U1 becomes equal to the wire length of the address/command line to the second memory-module assembly unit U2, making the timing design simple.

A clock line S1-1 for the memory modules pertaining to the first memory-module assembly unit U1 is wired from a first clock pin CLK-1 of the memory controller 100 through the first connector C1-1 while a clock line S1-2 for the memory modules pertaining to the second memory-module assembly unit U2 is wired from a second clock pin CLK-2 of the memory controller 100 through the first connector C1-2. In the present embodiment, clock signals are supplied to the first memory-module assembly unit U1 and the second memory-module assembly unit U2 from the first clock pin CLK-1 and the second clock pin CLK-2 respectively as shown in FIG. 12. It should be noted, however, that the clock signals can each be provided by a clock driver having an embedded PLL therein.

Also in the case of the present invention, the clock line S1, the address/command line S2 and the data line S3 are wired from the memory controller 100 to the memory modules 10 of the first and second memory-module assembly units U1 and U2 by the same wiring implementation, at equal wire lengths and at equal wiring impedances. In addition, a fixed number of loads are connected to each of the signal lines. In the case of the present embodiment, the number of loads is 16.

In an operation to write or read out data into or from a desired memory module pertaining to the first memory-module assembly unit U1 in the source-clock-synchronized memory system with a configuration described above, the memory controller 100 outputs a control signal to the first switch SW1 for connecting the write-data output pin Data/Write to the data line on the first memory-module assembly unit U1 or a control signal to the second switch SW2 for connecting the read-data input pin Data/Read to the data line on the first memory-module assembly unit U1. At the same time, the memory controller 100 outputs a control signal to the third switch SW3 for connecting the address/command line wired to the memory controller 100 to the address/command line on the first memory-module assembly unit U1. Later on, the memory controller 100 asserts clock and address signals on the clock and address/command lines respectively and, in the case of a write-data operation, data on the data line. In this way, the data is written into the desired memory module or, data is read out from the desired memory module pertaining to the first memory-module assembly unit U1.

In an operation to write or read out data into or from a desired memory module pertaining to the second memory-module assembly unit U2, on the other hand, it will probably be understandable that, the memory controller 100 outputs the control signals to the first, second and third switches SW1, SW2 and SW3 so as to connect the data and address/command lines of the memory controller 100 to those on the second memory-module assembly unit U2.

According to the present embodiment, the data storage capacity per memory bank of the memory to and from which data can be written and read out by the memory controller can be doubled. In addition, since each signal line can be made relatively shorter, the waveform is not weakened and the memory access latency can also be reduced as well.

Furthermore, according to the present embodiment, a fixed number of loads are connected to each of the signal lines. In the case of the present embodiment, the number of loads is 16. In addition, the clock, address and data signals are conveyed by signal lines having uniform wiring implementation. As a result, the line propagation delay time is the same for all the signals, making the timing design simple.

Instead of employing the third switch SW3 for selecting either the address/command line S2-1 on the first memory-module assembly unit U1 or the address/command line S2-2 on the second memory-module assembly unit U2, the address/command line S2 from the memory controller 100, the address/command line S2-1 and the address/command line S2-2 can be wired to form a T branch connection if a timing margin exists. In this case, since a memory access can be made without address calculation for determining the selection of a memory bank, that is, for selecting either the first memory-module assembly unit U1 or the second memory-module assembly unit U2, the access latency can be reduced, allowing the system performance to be enhanced.

In addition, the clock lines S1-1 and S1-2 can be folded back to the memory controller 100 through the second connectors C2-1 and C2-2 respectively. In this way, the clock signals can be supplied back to the memory controller 100 for latching read data. With such a scheme, a difference in delay time caused by a difference in number of memory modules mounted on the memory-module assembly unit can be canceled by the delay time incurred by the clock signals.

Figure 13:
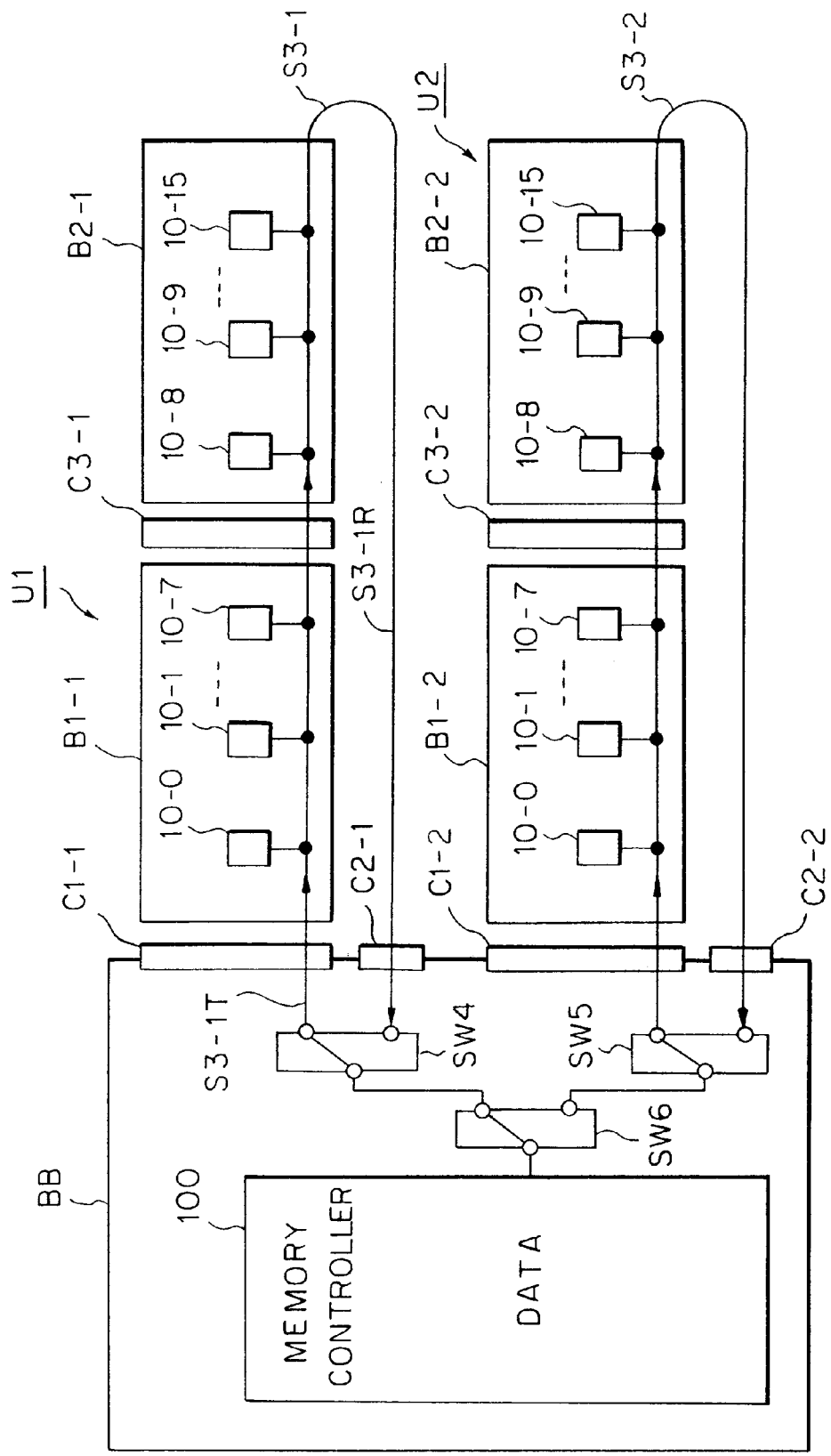
FIG. 13 is a diagram illustrating the configuration and connection of a data line of a source-clock-synchronized memory system implemented by a seventh embodiment of the present invention.

The following is description of a source-clock-synchronized memory system implemented by a seventh embodiment of the present invention with reference to FIG. 13. FIG. 13 is a diagram showing the source-clock-synchronized memory system implemented by the seventh embodiment. As shown in FIG. 13, in the memory controller 100, a data input/output common pin Data is used in place of the write-data output pin Data/Write and the read-data input pin Data/Read. A switch SW4 is provided on the base board BB for selecting either a write-data line wired to the first memory-module assembly unit U1 through the first connector C1-1 or a read-data line wired from the first memory-module assembly unit U1 through the second connector C2-1 in accordance with a control signal generated by the memory controller 100. A switch SW5 is provided on the base board BB for selecting either a write-data line wired to the second memory-module assembly unit U2 through the first connector C1-2 or a read-data line wired from the second memory-module assembly unit U2 through the second connector C2-2 in accordance with the control signal generated by the memory controller 100. A switch SW6 is provided on the base board BB for connecting the data input/output common pin Data to either a data line selected by the switch SW4 or a data line selected by the switch SW5 in accordance with a control signal generated by the memory controller 100. The control signals generated by the memory controller 100 for actuating the switches SW4, SW5 and SW6 are not shown in FIG. 13. The address/command line of the source-clock-synchronized memory system provided by the seventh embodiment is implemented in the same way as the sixth embodiment shown in FIG. 12.

In an operation to write or read out data into or from a desired memory module pertaining to the first memory-module assembly unit U1 in the source-clock-synchronized memory system with a configuration described above, first of all, the memory controller 100 outputs a control line to the switch SW6 to connect the data input/output common pin Data to a data line on the memory-module assembly unit U1 selected by the switch SW4. Operations are carried out thereafter in the same way as the third embodiment shown in FIG. 6. As described earlier, in an operation to write data into one of the memory modules 10-0 to 10-15, the switch SW0 shown in FIG. 6 is actuated to connect the data input/output common pin Data to the write data line S3 through the first connector C1. In this state, the clock signal, the address signal and data are output from the memory controller 100 at the same time through the clock line S1, the address line S2 and the data line S3 respectively. In the case of the seventh embodiment, the switch SW4 shown in FIG. 13 is actuated to connect the switch SW6, that is, the data input/output common pin Data, to the write data line S3-1T serving as a transmission line through the first connector C1-1. Once the memory system has been put in this state, operations are carried out thereafter in the same way as the first embodiment.

In detail, in an operation to write data into one of the memory modules 10-0 to 10-15 pertaining to the first memory-module assembly unit U1, for example, the clock signal, the address signal and data are propagated from the memory controller 100 at the same time along the clock line S1, the address/command line S2 and the data line S3 respectively by way of the switch SW6, the switch SW4 and the first connector C1-1 to the memory riser boards B1-1 and B2-1, arriving at the memory modules 10 with the fixed offset phase differences maintained as they are. In this way, the data is written into the desired memory module specified by the address signal.

In an operation to read out data from one of the memory modules 10-0 to 10-15 pertaining to the second memory-module assembly unit U2, on the other hand, first of all, the memory controller 100 outputs a control line to the switch SW6 to connect the data input/output common pin Data to a data line on the memory-module assembly unit U2 selected by the switch SW5. Then, the clock signal and the address signal are output from the memory controller 100 at the same time to the memory riser boards B1-2 and B2-2 of the second memory-module assembly unit U2 along the clock line S1 and the address/command line S2 respectively. At that time, the switch SW5 is actuated to connect the switch SW6, that is, the data input/output common pin Data, to the read data line S3-1R serving as a return line through the second connector C2-2. Data is then output by the memory module specified by the address line after an access time Tac has lapsed since the arrival of the clock (CLK) signal at the memory module. The data is transferred to the data input/output common pin Data of the memory controller 100 by way of the read data line S3-1R serving as a return line, the second connector C2-2, the switch 5 and the switch SW6. The memory controller 100 finally fetches the data arriving at the data input/output common pin Data.

According to the present embodiment, it is possible to implement a source-clock-synchronized memory system wherein memory modules 10 are mounted with a data storage capacity equal to a capacity of two memory banks while the number of terminals (pins) provided on a memory controller is reduced or, to be more specific, the number of data pins provided on the memory controller corresponds merely to the width of each of the memory module. In comparison with a conventional source-clock-synchronized memory system wherein memory modules mounted on one memory riser board constitute a memory bank and two memory riser boards are employed to provide two memory banks, the number of pins according to the present invention is reduced to ¼ to provide an equal data storage capacity. As a result, the cost of the memory controller can be lowered.

Figure 14:
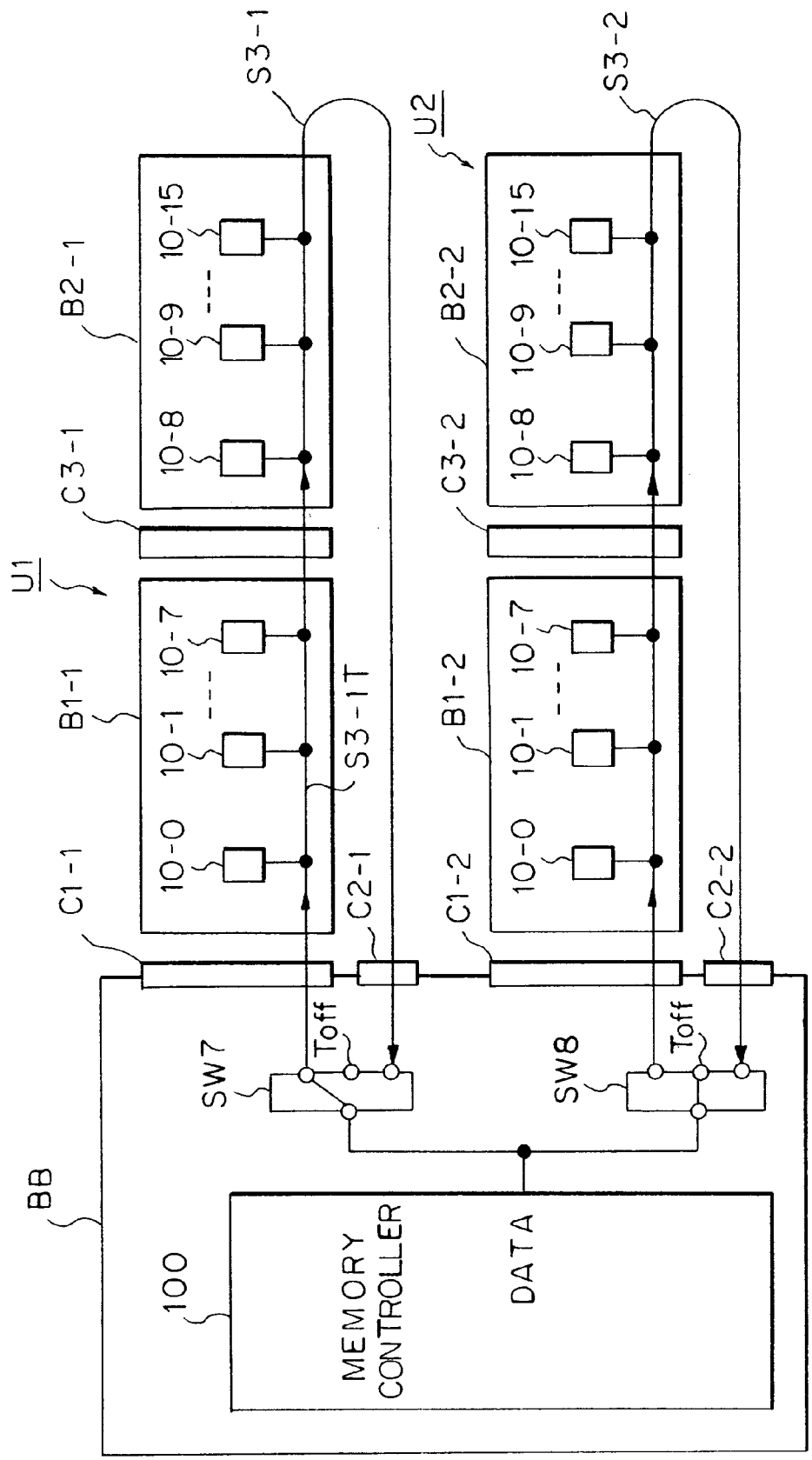
FIG. 14 is a diagram illustrating the configuration and connection of a data line of a source-clock-synchronized memory system implemented by an eighth embodiment of the present invention.

The following is description of a source-clock-synchronized memory system implemented by an eighth embodiment of the present invention with reference to FIG. 14. FIG. 14 is a diagram showing the source-clock-synchronized memory system implemented by the eighth embodiment. The eighth embodiment has the same functions as the seventh embodiment except that, as shown in the figure, the roles played by the switch SW4 to SW6 of the seventh embodiment are played by merely two three-state switches SW7 and SW8.

As shown in FIG. 14, the switches SW7 and SW8 are associated with the memory-module assembly units U1 and U2 respectively. When a memory module pertaining to either memory-module assembly unit U1 or U2 is accessed, the switch SW7 or SW8 puts the line connection of the accessed unit for either a read or write cycle. The other switch disconnects the unit not being accessed. Assume, for example, that the first memory-module assembly unit U1 shown in FIG. 14 is accessed in a write cycle. The switch SW7 is actuated so as to connect the data input/output common pin Data of the memory controller 100 to the data line S3-1T on the first memory-module assembly unit U1 which serves as a data transmission line. The common pole of the switch SW8 is brought into contact with a pole Toff to set the data line on the second memory-module assembly unit U2 at a high impedance.

According to the present embodiment, by controlling three-state switches each including an off (high-impedance) state as described above, it is possible to provide a source-clock-synchronized memory system that employs only two such switches. The source-clock-synchronized memory system implemented by the eighth embodiment exhibits the same effects as those of the seventh embodiment.

Figure 15:
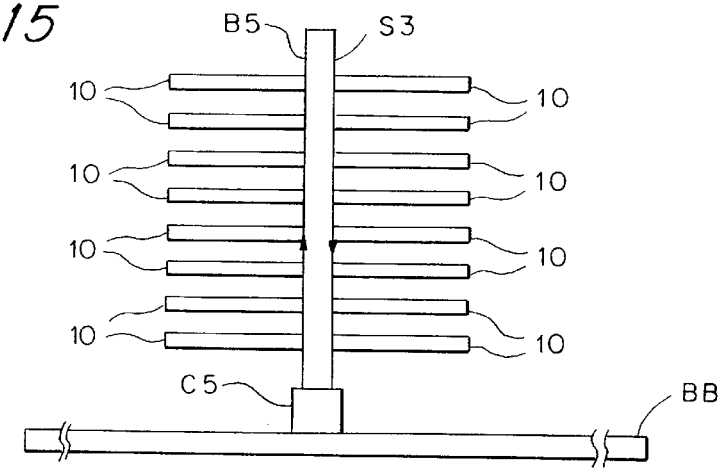
FIG. 15 is a diagram illustrating an external view and a rough configuration of a source-clock-synchronized memory system implemented by a ninth embodiment of the present invention.

The following is description of a source-clock-synchronized memory system implemented by a ninth embodiment of the present invention with reference to FIG. 15. FIG. 15 is a skeleton diagram showing an external view of the source-clock-synchronized memory system implemented by the ninth embodiment. As shown in FIG. 15, in the case of the source-clock-synchronized memory system implemented by the ninth embodiment, memory modules are mounted on the front and back surfaces of a memory riser board B5 at predetermined intervals in the horizontal direction. In more detail, in the source-clock-synchronized memory system implemented by the ninth embodiment, a plurality of memory-module sockets are mounted on the front and back surfaces of the memory riser board B5 at the predetermined intervals. The memory-module sockets which are not shown in the figure are each a surface mounting component for mounting a memory module. It should be noted, however, that the memory modules can also be mounted on the memory raiser board B5 with the positions of the memory-module sockets on the front surface shifted from the positions of the memory-module sockets on the back surface.

The circuit connection of the source-clock-synchronized memory system implemented by the present embodiment is the same as that of the first embodiment except that the board linking connector C3 is eliminated and that the first and second connectors C1 and C2 are replaced by a connector C5 connected to signal lines created on the front and back surfaces of the memory riser board B5. The source-clock-synchronized memory system implemented by the present embodiment also operates in the same way as the first embodiment.

Figure 16:
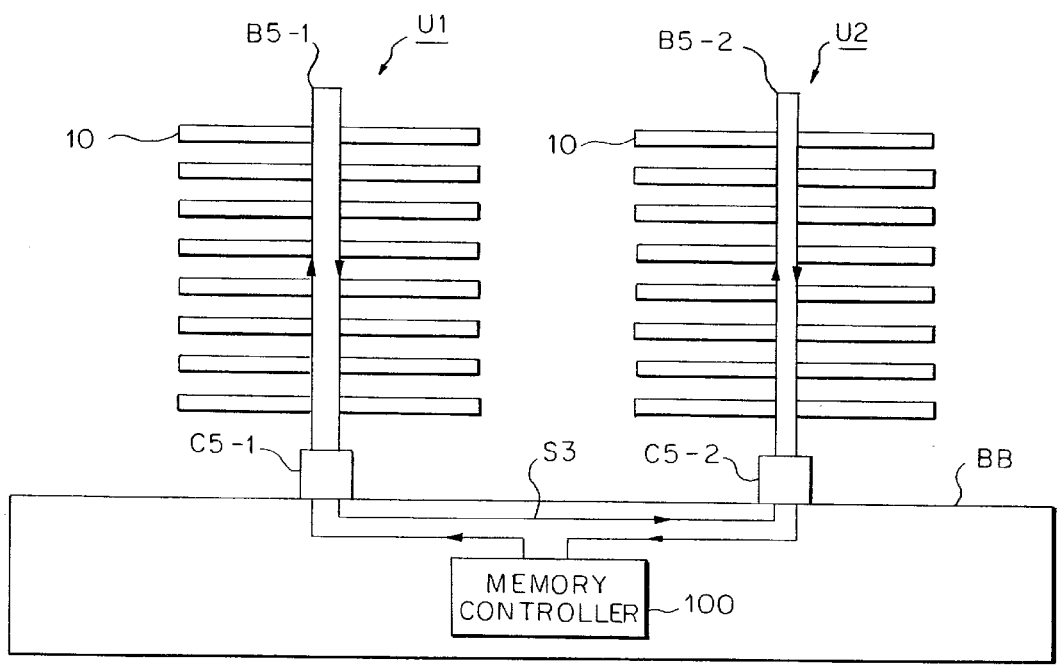
FIG. 16 is a diagram illustrating an external view and a rough configuration of a source-clock-synchronized memory system implemented by a tenth embodiment of the present invention.

FIG. 16 is a skeleton diagram showing an external view of a source-clock-synchronized memory system implemented by a tenth embodiment of the present invention. As shown in FIG. 16, the source-clock-synchronized memory system implemented by the tenth embodiment includes two memory-module assembly units U1 and U2 each includes a memory riser board B5, a plurality of memory modules mounted on the memory riser board B5 and a connector C5 which are configured in the same way as the ninth embodiment. Connection between the two connectors C5 is the same as that of the sixth embodiment shown in FIGS. 8 and 9.

According to the ninth and tenth embodiments, it is possible to provide a source-clock-synchronized memory system with a simple structure, few components and small mounting surfaces in comparison with a source-clock-synchronized memory system wherein two memory riser boards are connected with each other by a board linking connector. In addition, since only one memory riser board is employed in every memory-module assembly unit, there are merits that the assembly work is simpler and the mechanical precision of the board is not much required.

Figure 17A:
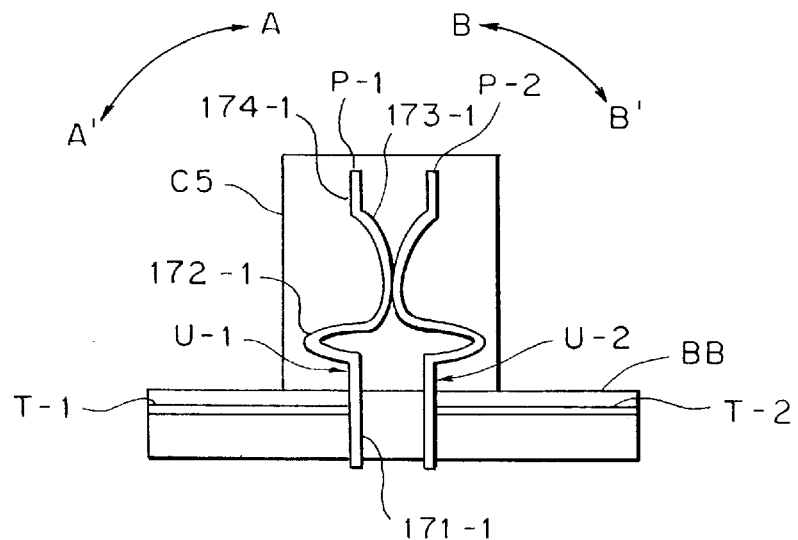
FIGS. 17a and 17b are diagrams each illustrating a side cross section of a preferred connector employed in the ninth and tenth embodiments.
Figure 17B:
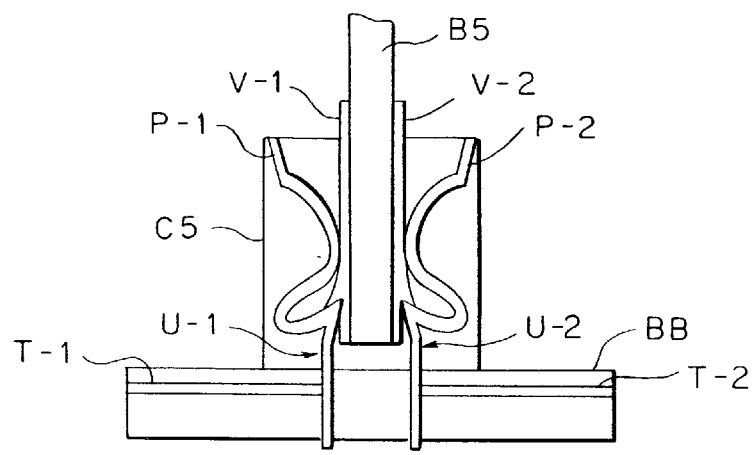

The following is description of the connector C5 employed in the ninth and tenth embodiments. FIGS. 17A and B are skeleton diagrams each showing a side cross section of the connector C5. To be more specific, FIG. 17A is a diagram which shows the state of the connector C5 before a memory riser board is plugged into it while FIG. 17B is a diagram which shows the state of the connector C5 after a memory riser board is plugged into it.

As shown in FIG. 17A, the connector C5 has first and second pins P-1 and P-2 to be brought into contact with wires V-1 and V-2 on the front and rear surfaces of the memory riser board B5 respectively. The first and second pins P-1 and P-2 penetrate the base board BB, being electrically connected to wires T-1 and T-2 in the base board BB respectively. In the base board BB, the wires T-1 and T-2 are insulated from each other.

The first and second pins P-1 and P-2 are made of an electrically conductive and elastic material such as a thin metallic plate. As shown in FIG. 17A, each first pin P-1 comprises a base portion 171-1 extended from the base board BB perpendicularly to the base board BB, a first bent portion 172-1 extended from the upper end of the base portion 171-1 and curved to depart from the second pin P-2, a second bent portion 173-1 extended from the upper end of the first bent portion 172-1 and curved to come in contact with the second pin P-2 and a guide portion 174-1 extended vertically from the upper end of the second bent portion 173-1. The second pin P-2 has a shape symmetrical with the first pin P-1. The first and second pins P-1 and P-2 are supported by support points U-1 and U-2. The upper ends of the first and second pins P-1 and P-2 are free.

The first and second pins P-1 and P-2 are pressed against each other in directions indicated by arrows A and B respectively so that the second bent portions 173-1 and 173-2 are brought into contact with each other. Thus, with the memory riser board B5 not plugged in, the first and second pins P-1 and P-2 are brought into contact with each other, electrically connecting the wires T-1 and T-2 in the base board BB to each other.

When the memory riser board B5 is inserted, the memory riser board B5 passes through a gap between the guide portion 174-1 of the first pin P-1 and the guide portion 174-2 of the second pin P-2, reaching the second bent portions 173-1 and 173-2 of the first and second pins P-1 and P-2 respectively. As the memory riser board B5 is inserted further deeply, while the wire (land) V-1 on the front surface of the memory riser board B5 is coming in contact with the second bent portion 173-1 of the first pin P-1, the first pin P-1 is rotated around the support point U-1, being bent in a direction indicated by an arrow A'. While the wire (land) V-2 on the back surface of the memory riser board B5 is coming in contact with the second bent portion 173-2 of the second pin P-2, the second pin P-2 is rotated around the support point U-2, being bent in a direction indicated by an arrow B'. By inserting the memory riser board B5 in this way, the wire V-1 on the front surface of the memory riser board B5 is brought into electrically conductive contact with the wire T-1 in the base board BB whereas the wire V-2 on the back surface of the memory riser board B5 is brought into electrically conductive contact with the wire T-2 in the base board BB as shown in FIG. 17B.

As described above, in the ninth and tenth embodiments, the wires V-1 and V-2 are connected to each other on the upper end of the memory riser board B5. Thus, the wires T-1 and T-2 in the base board BB are electrically connected to each other eventually through the memory riser board B5.

In this connector C5, with the memory riser board B5 not plugged in, the two pins P-1 and P-2 of the connector C5 which are electrically connected to the wires T-1 and T-2 respectively in the base board BB come in contact with each other. When the memory riser board B5 is inserted, on the other hand, the two pins P-1 and P-2 are brought into electrical contact with the wires V-1 and V-2 on the front and back surfaces of the memory riser respectively. As a result, by using this connector C5, it is possible to form a ring wire starting from the memory controller and ending at the memory controller without regard to whether or not the memory riser board B5 is plugged into the connector C5.

It should be noted that, while the present invention has been explained with reference to the preferred embodiments, the explanation is not to be construed in a limiting sense. That is to say, the scope of the present invention described in the claims is not limited to the embodiments. Thus, a variety of changes and modifications can be made to the embodiments without departing from the scope of the present invention. It is needless to say that such changes and modifications are also included in the scope of the present invention.

Figure 18:
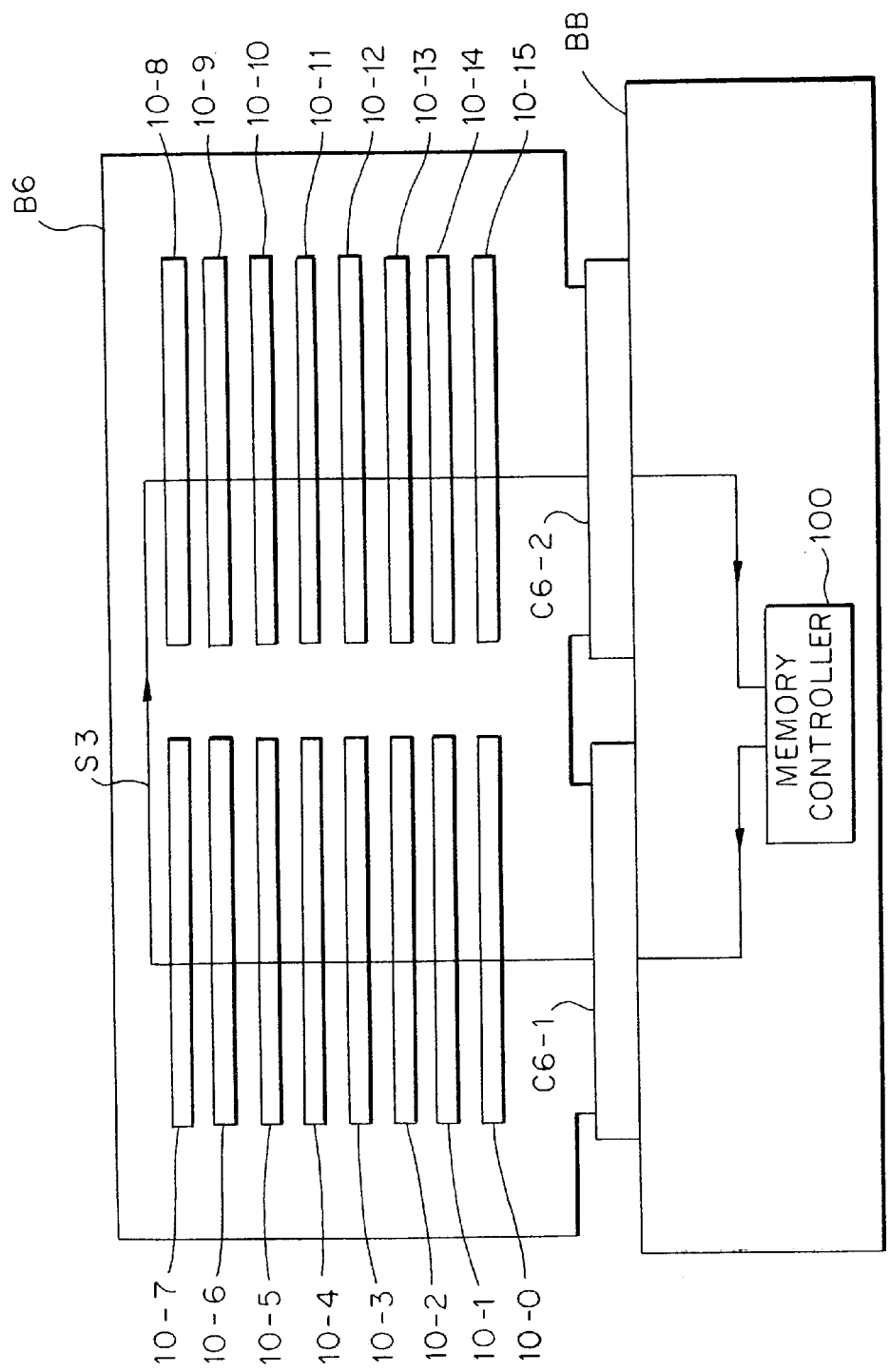
FIG. 18 is a diagram illustrating another memory riser board provided by the present invention.

In the case of the first to third embodiments, for example, memory modules are mounted one after another at predetermined intervals on one surface of a memory riser board and a board linking connector is used for connecting the upper ends of two memory riser boards to each other. It should be noted, however, that the present invention is not limited to such a configuration. For example, memory modules can be mounted two modules after two modules on a memory riser B6 at predetermined intervals as shown in FIG. 18. First and second connectors C6-1 and C6-2 shown in the figure correspond to the first and second connectors C1 and C2 respectively shown in FIGS. 1, 5 and 6. A data line S3 starting from the first connector C6-1 is wired to a first series of memory modules 10-0 to 10-7 on the memory riser board B6 sequentially one module after another and is then folded through the upper end of the memory riser board B6. The data line S3 is then wired to a second series of memory modules 10-8 to 10-15 on the memory riser board B6 sequentially one module after another, arriving at the second connector C6-2.

Thus, the data line S3 starting from the memory controller 100 passes through the first connector C6-1, the memory riser board B6 and the second connector C6-2, returning back to the memory controller 100. A clock line S1 is implemented in the same way as the data line S3. On the other hand, an address/command line S2 is wired in the same way as the clock and data lines S1 and S3 up to the memory module 10-15 but, instead of continuing to the second connector C6-2, the address/command line S2 is ended by a matching terminator on the memory riser board B6. As a result, it is possible to operate this source-clock-synchronized memory system in the same way as the first embodiment. By ending the clock line S1 by a matching terminator on the memory riser board B6, it will probably be comprehensible that this source-clock-synchronized memory system can be operated in the same way as the second embodiment. In addition, by providing a switch on the base board BB, it will probably be comprehensible as well that this source-clock-synchronized memory system can be operated in the same way as the third embodiment. According to the present embodiment, more memory modules can be mounted on one memory riser board B6.

According to the present embodiment, it is possible to implement a source-clock-synchronized memory system having a simple structure as well as an assured mechanical precision and strength in spite of reduced board and connector counts.

In addition, by employing a plurality of memory riser boards shown in FIG. 18, it is possible to implement a source-clock-synchronized memory system that is capable of operating in the same way as any one of the fifth to eighth embodiments. By providing a switch on the memory riser board B6 and taking the wiring of each signal line into consideration, it is possible to implement a source-clock-synchronized memory system that is capable of operating in the same way as the fourth embodiment shown in FIG. 7. In this case, either only one or two connectors can be provided.

As described above, in the case of the third and fourth embodiments, the clock line is ended by a matching terminator on a memory riser board whereas, in the sixth to eighth embodiments, both of the two clock lines are ended by matching terminators on the memory riser boards. It should be noted, however, that the present invention is not limited to these schemes. The source-clock-synchronized memory system can have a configuration wherein clock signal can be returned to the memory controller by folding back the clock line to the memory controller by way of a predetermined connector. In the fifth, ninth and tenth embodiments, the clock line can also be folded back to the memory controller by way of a predetermined connector.

Furthermore, a switch for changing the connection of the data line or other lines can be provided on the base board BB of the ninth or tenth embodiment. In this way, the ninth and tenth embodiments can operate in the same way as the third and seventh embodiments.

Figure 19:
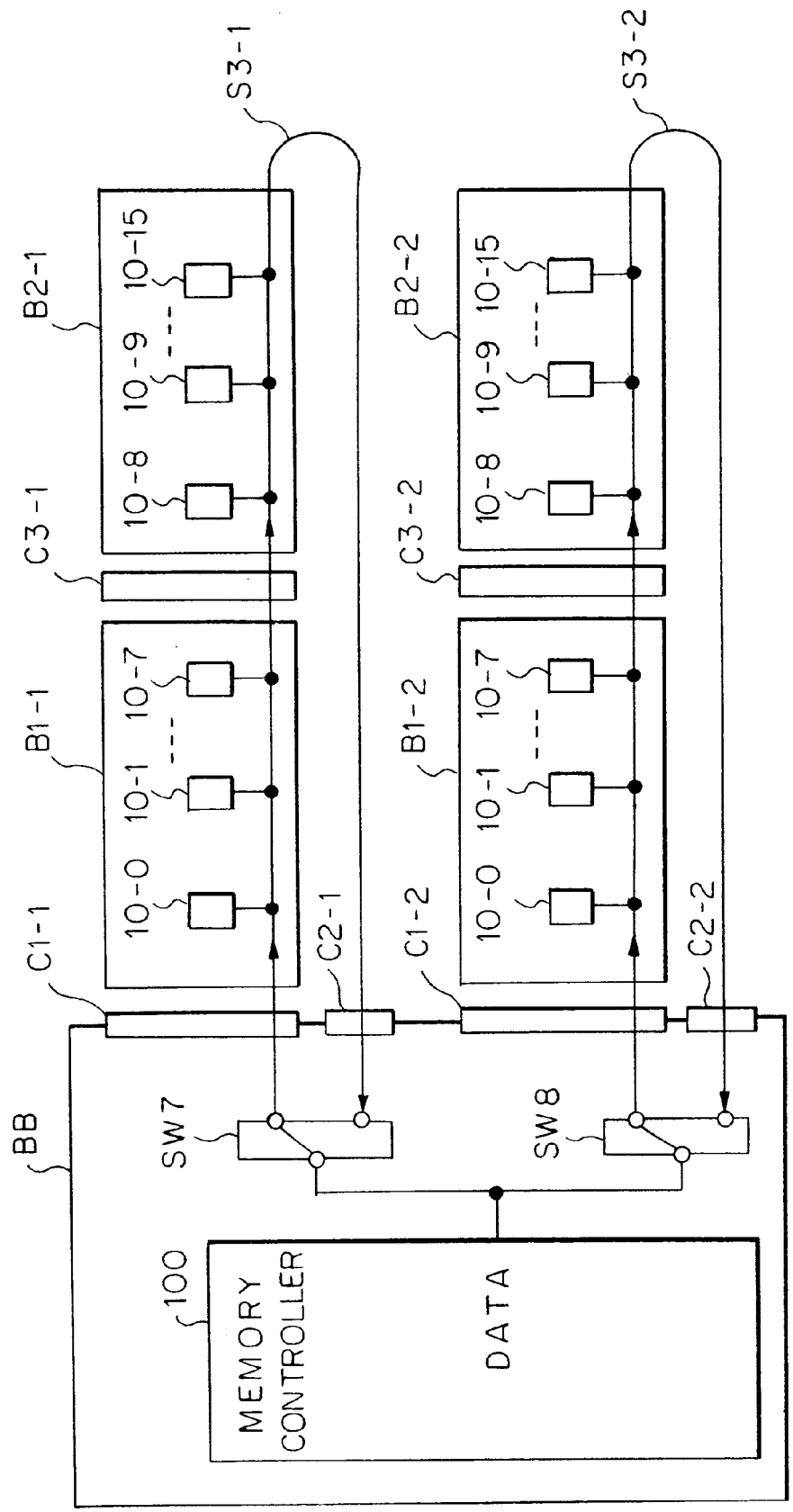
FIG. 19 is a diagram illustrating another typical configuration of a source-clock-synchronized memory system provided by the present invention.

In the eight embodiment, three-state switches are employed. If there is no bad effect on the line capacity, however, the load and the data delay time, ordinary switches SW1 and SW2 can also be used as shown in FIG. 19. in place of the three-state switches. In this case, the switches SW1 and SW2 are controlled by using the same control signals to actuate in the same directions, that is, to connect a correct signal line, whereas CS, RAS and CAS signals which are not shown in the figure are used to implement memory bank switching. In this way, only one signal is sufficient for controlling the switches SW1 and SW2, allowing the number of terminals (pins) provided on the memory controller to be reduced.

Furthermore, in the case of the first to third embodiments and the fifth to eighth embodiments, eight memory modules can be mounted on a memory riser board, in the case of the fourth embodiment, sixteen memory boards can be mounted on a memory riser board and, in the case of the ninth and tenth embodiments, eight memory modules can be mounted on each of the front and back surfaces of a memory riser board. It is obvious, however, that there is no limitation on the number of memory modules that can be mounted on a memory riser board.

The clock signal propagating through the clock line S1 in the embodiments described above does not have to be output from the clock pin of the memory controller 100. That is to say, the clock signal can be generated by an external clock driver having an embedded PLL (Phase Locked Loop). In this case, in an operation to read out data from a desired memory module, it is necessary to generate a clock signal by the external clock driver having an embedded PLL at the same frequency and the same phase at the first connector C1 as the clock signal that would otherwise be generated by the memory controller.

An external clock driver IC having an embedded PLL generally has about ten pins. By using such a clock driver IC, the clock pin of the memory controller can be eliminated. In particular, in the case of a memory controller for supporting a plurality of memory banks, the output pin of the clock driver IC is used instead of providing as many clock output pins as memory banks on the memory controller IC. As a result, the number of terminals (pins) provided on the memory controller can be reduced. Since the existence of the clock driver IC having an embedded PLL increases the size of the skew, however, the skew should be taken into consideration during the system design.

Furthermore, in the case of the fifth to eighth and tenth embodiments, a couple of memory-module assembly units are employed. It is obvious, however, that three or more memory-module assembly units can also be used in the configuration of a source-clock-synchronized memory system. In this case, if it is feared that the waveform of a signal is weakened, a bus driver or a bus driver having a latch can be provided at a proper location on the line of the signal to prevent the waveform thereof from being weakened.

The function of a means or a member described in the present patent specification can be implemented by using two or more physical means or members and, conversely, functions of two or more means or members can be implemented by one physical means or member.

FIG. 22 illustrates an information processing system such as a server wherein the source-clock-synchronized memory system of the present invention is implemented. The information processing system illustrated in FIG. 22 includes a plurality of processors 200 each being connected to the source-clock-synchronized memory system of the present invention. The source-clock-synchronized memory system of the present invention includes, as described above, the memory controller 100 which is connected to first connector C1 and second connector C2. The first connector C1 is connected to the first memory riser board B1 and the second connector C2 is connected to the second memory riser board B2. As per the above, a plurality of memory modules 10 are provided on the first and second memory riser boards B1 and B2. The signal lines of the first and second memory riser boards B1 and B2 are connected by a board linking connector C3.

The source-clock-synchronized memory system of the present invention, as implemented in the information processing system illustrated in FIG. 22 can be configured in any of the above-described configurations of the first through tenth embodiments of the present invention. Particularly, the source-clock-synchronized memory system of the present invention when implemented in a server allows for the availability of a large amount of memory in the server.

The information processing system as illustrated in FIG. 22 further includes a bridge 202-1 which allows for each of the processors 200 to access input/output devices through the I/O bus, bridges 204 and PCI's.

According to the present invention, it is possible to provide a source-clock-synchronized memory system having an increased data storage capacity per memory bank and a high mounting density resulting from the adoption of an efficient mounting technique.

In addition, it is also possible to provide a source-clock-synchronized memory system having fewer terminals (pins) provided on a memory controller. Furthermore, it is also possible to provide a source-clock-synchronized memory system allowing a ring topology to be formed by connecting a plurality of memory riser boards to each other.

While the present invention has been described in detail and pictorially in the accompanying drawings it is not limited to such details since many changes and modifications recognizable to those of ordinary skill in the art may be made to the invention without departing from the spirit and the scope thereof.

We claim:

1. A source-clock-synchronized memory system for use in apparatus which includes a base board and a memory controller provided on said base board, said source-clock-synchronized memory system comprising:

a memory unit for mounting on said base board, wherein said memory unit comprises:

a first memory riser board mounted on said base board through a first connector with a plurality of first memory modules mounted on the front surface of said first memory riser board, a second memory riser board mounted on said base board through a second connector with a plurality of second memory modules mounted on the front surface of said second memory riser board, wherein said first and second memory riser boards are arranged such that the back surface of said first memory riser board faces the back surface of said second memory riser board, and a board linking connector for connecting signal lines on said first memory riser board to corresponding signal lines on said second memory riser board, wherein said signal lines includes address/command and data lines, each being accompanied by clock signal lines, that start from said memory controller, pass through said first connector, are wired to said first memory modules mounted on said first memory riser board sequentially one module after another, pass through said board linking connector and are wired to said second memory modules mounted on said second memory riser board sequentially one module after another, and wherein at least said data line further passes through said second connector and is connected back to said memory controller in a ring state.

2. A source-clock-synchronized memory system according to claim 1, wherein said address/command line is ended by a matching terminator on said second memory riser board and said clock line further passes through said second connector and is connected back to said memory controller.

3. A source-clock-synchronized memory system according to claim 1, wherein said clock and address/command lines are each ended by a matching terminator on said second memory riser board.

4. A source-clock-synchronized memory system according to claim 1, further comprising:

a switch provided on said base board for connecting said data line wired to said memory controller to either said data line on said first memory riser board passing through said first connector or said data line on said second memory riser board passing through said second connector in accordance with a control signal generated by said memory controller so that data to be written into a desired memory module in said memory unit can be transferred from said memory controller to said desired memory module through said data line by way of said switch and said first connector whereas data read out from a desired memory module in said memory unit can be transferred from said desired memory module to said memory controller through said data line by way of said second connector and said switch.

5. A source-clock-synchronized memory system according to claim 2, further comprising:

a switch provided on said base board for connecting said data line wired to said memory controller to either said data line on said first memory riser board passing through said first connector or said data line on said second memory riser board passing through said second connector in accordance with a control signal generated by said memory controller so that data to be written into a desired memory module in said memory unit can be transferred from said memory controller to said desired memory module through said data line by way of said switch and said first connector whereas data read out from a desired memory module in said memory unit can be transferred from said desired memory module to said memory controller through said data line by way of said second connector and said switch.

6. A source-clock-synchronized memory system according to claim 3, further comprising:

a switch provided on said base board for connecting said data line wired to said memory controller to either said data line on said first memory riser board passing through said first connector or said data line on said second memory riser board passing through said second connector in accordance with a control signal generated by said memory controller so that data to be written into a desired memory module in said memory unit can be transferred from said memory controller to said desired memory module through said data line by way of said switch and said first connector whereas data read out from a desired memory module in said memory unit can be transferred from said desired memory module to said memory controller through said data line by way of said second connector and said switch.

7. A source-clock-synchronized memory system for use in apparatus which includes a base board and a memory controller provided on said base board, said source-clock-synchronized memory comprising:

a memory unit for mounting on said base board, wherein said memory unit comprises:

a memory riser board mounted on said base board through at least a connector, said memory riser board being provided with a plurality of front memory modules mounted on the front surface of said memory riser board and a plurality of back memory modules mounted on the back surface of said memory riser board, wherein signal lines including address/command and data lines, each being accompanied by a clock signal line, start from said memory controller, pass through said connector, are wired to said front memory modules mounted on said front surface of said first memory riser board sequentially one module after another, pass through the top of said memory riser board and are wired to said back memory modules mounted on said back surface of said memory riser board sequentially one module after another; and wherein at least said data line further passes through said connector and is connected back to said memory controller in a ring state.

8. A source-clock-synchronized memory system according to claim 7, wherein said address/command line is ended by a matching terminator on said back surface of said memory riser board and said clock line further passes through said connector and is connected back to said memory controller.

9. A source-clock-synchronized memory system according to claim 7, wherein said clock and address/command lines are each ended by a matching terminator on said back surface of said memory riser board.

10. A source-clock-synchronized memory system according to claim 7, further comprising:

a switch provided on said base board for connecting said data line wired to said memory controller to either said data line on said front surface of said memory riser board passing through said connector or said data line on said back surface of said memory riser board passing through said connector in accordance with a control signal generated by said memory controller so that data to be written into a desired memory module in said memory unit can be transferred from said memory controller to said desired memory module through said data line by way of said switch and said connector whereas data read out from a desired memory module in said memory unit can be transferred from said desired memory module to said memory controller through said data line by way of said connector and said switch.

11. A source-clock-synchronized memory system according to claim 8, further comprising:

a switch provided on said base board for connecting said data line wired to said memory controller to either said data line on said front surface of said memory riser board passing through said connector or said data line on said back surface of said memory riser board passing through said connector in accordance with a control signal generated by said memory controller so that data to be written into a desired memory module in said memory unit can be transferred from said memory controller to said desired memory module through said data line by way of said switch and said connector whereas data read out from a desired memory module in said memory unit can be transferred from said desired memory module to said memory controller through said data line by way of said connector and said switch.

12. A source-clock-synchronized memory system according to claim 9, further comprising:

a switch provided on said base board for connecting said data line wired to said memory controller to either said data line on said front surface of said memory riser board passing through said connector or said data line on said back surface of said memory riser board passing through said connector in accordance with a control signal generated by said memory controller so that data to be written into a desired memory module in said memory unit can be transferred from said memory controller to said desired memory module through said data line by way of said switch and said connector whereas data read out from a desired memory module in said memory unit can be transferred from said desired memory module to said memory controller through said data line by way of said connector and said switch.

13. A source-clock-synchronized memory system for use in apparatus which includes a base board, and a memory controller provided on said base board, said source-clock-synchronized memory system comprising:

a memory unit provided on said base board, wherein said memory unit comprises:

a memory riser board mounted on said base board through at least a connector with a plurality of memory modules mounted on the front and back surfaces of said memory riser board, and a switch for connecting a data line wired to said connector to one of two data lines wired to said modules in accordance with a control signal output by said memory controller;

wherein signal lines including address/command lines, each being accompanied by a clock signal line, start from said memory controller, pass through said connector and are wired to said memory modules mounted on the front and back surfaces of said memory riser board sequentially one module after another; and wherein a data line including said data line wired to said connector and said two data lines wired to said memory modules starts from said memory controller, passes through said connector and said switch, is wired to said memory modules mounted on the front and back surfaces of said memory riser board sequentially one module after another, passes through said switch again and is folded back to said memory controller, said data lines passing to each of said modules from said memory controller in a ring state.

14. A source-clock synchronized memory system according to claim 13, wherein said switch is provided on said memory riser board.

15. A memory unit for use in apparatus which includes a base board and a memory controller provided on said base board, said memory unit comprising:

a first memory riser board mounted on said base board through a first connector with a plurality of first memory modules mounted on the front surface of said first memory riser board;

a second memory riser board mounted on said base board through a second connector with a plurality of second memory modules mounted on the front surface of said second memory riser board, wherein said first and second memory riser boards are arranged such that the back surface of said first memory riser board faces the back surface of said second memory riser board; and a board linking connector for connecting signal lines on said first memory riser board to corresponding signal lines on said second memory riser board, wherein said signal lines address/command and data lines, each being accompanied by a clock signal line, start from contact points on said first connector, are wired to said first memory modules mounted on said first memory riser board sequentially one module after another, pass through said board linking connector and are wired to said second memory modules mounted on said second memory riser board sequentially one module after another, said data lines passing to each of said modules from said memory controller in a ring state, and wherein at least said data line is further extended to another contact point on said second connector.

16. A memory unit according to claim 15, wherein said contact points on said connector of said memory unit are wired to said memory controller, wherein ends of signal lines on another memory unit are wired through a connector thereof to said contact points on said connector of said memory unit to form a daisy chain connecting said memory modules of said memory units to said memory controller, and wherein at least said data line in a last memory unit is further extended from a contact point on a connector of said last memory unit to said memory controller.

17. A memory unit according to claim 15, further comprising:

a first switch, provided on said base board, for connecting first controller-side signal lines wired to said memory controller to first module-side signal lines wired to said memory unit selected from a plurality of memory units by a first control signal generated by said memory controller; and a second switch, provided on said base board, for connecting second controller-side signal lines wired to said memory controller to second module-side signal lines wired to another memory unit from said plurality of memory units by a second control signal generated by said memory controller, wherein data is written into one of said memory modules in said memory unit whose first module-side signal lines are connected by said first switch, and wherein data is read out from one of said memory module in said another memory unit whose second module-side signal lines are connected by said second switch.

18. A memory unit for use in apparatus which includes a base board and a memory controller provided on said base board, said memory unit comprising:

a memory riser board mounted on said base board through at least a connector with a plurality of front memory modules mounted on the front surface of said memory riser board and a plurality of back memory modules mounted on the back surface of said memory riser board; and a plurality of signal lines including address/command and data lines, each being accompanied by a clock signal line, said signal lines start from contact points on said connector, are wired to said front memory modules mounted on said front surface of said first memory riser board sequentially one module after another, pass through the top of said memory riser board and are wired to said back memory modules mounted on said back surface of said memory riser board sequentially one module after another, said data lines passing to each of said modules from said memory controller in a ring state, wherein at least said data line is further extended to another contact point on said connector.

19. A memory unit according to claim 18, wherein said contact points on said connector of said memory unit are wired to said memory controller, wherein ends of signal lines on another memory unit are wired through a connector thereof to said contact points on said connector of said memory unit to form a daisy chain connecting said memory modules of said memory units to said memory controller; and wherein at least said data line in a last memory unit is further extended from a contact point on a connector of said last memory unit to said memory controller.

20. A memory unit according to claim 18, further comprising:

a first switch provided on said base board, for connecting first controller-side signal lines wired to said memory controller to first module-side signal lines wired to said memory unit selected from a plurality of memory units by a first control signal generated by said memory controller; and a second switch provided on said base board for connecting second controller-side signal lines wired to said memory controller to second module-side signal lines wired to another memory unit from said plurality of memory units by a second control signal generated by said memory controller, wherein data is written into one of said memory modules in said memory unit whose first module-side signal lines are connected by said first switch, and wherein data is read out from one of said memory modules in said another memory unit whose second module-side signal lines are connected by said second switch.

21. A memory unit according to claim 20, wherein said first and second controller-side signal lines are disconnected from said memory controller; and wherein a third switch is further provided for connecting controller-side signal lines wired to said memory controller to said first controller-side signal lines wired to said first switch or said controller-side signal lines wired to said second switch based on a third control signal generated by said memory controller.

22. A memory unit according to claim 20, wherein said first and second switches can each be controlled to set said first or second controller-side signal lines wired to said memory controller to a high-impedance state.

23. A connector for removably mounting a memory unit which includes a memory riser board having a plurality of memory modules mounted on the front surface thereof, on a base board apparatus so as to connect signal lines on said memory unit to signal-line wires on said base board, said connector comprising:

a connector box having an accepting mouth for accepting and firmly holding said memory riser board of said memory unit, wherein a shape of said accepting mouth corresponds to a cross section of said memory riser board;

a first pin connected to one of said signal-line wires on said base board and extended from said base board to said accepting mouth; and a second pin connected to another of said separated signal-line wires on said base board and extended from said base board to said accepting mouth, wherein, when said memory riser board is not mounted, said first pin comes in contact with said second pin, electrically connecting signal-line wires connected to said pins to each other and when said memory riser board is mounted said first pin comes in contact with a signal line on the front surface of said memory riser board, electrically connecting said first pin to said signal line on said front surface whereas said second pin comes in contact with a signal line on the back surface of said memory riser board, electrically connecting said second pin to said signal line on said back surface.

24. A connector according to claim 23, wherein said first and second pins are each made of an elastic material, and wherein when said memory riser board is not mounted, said first pin comes in contact with said second pin due to an elastic property of said material.

25. A connector for connecting first and second memory riser boards of a memory unit which is included in apparatus having a base board upon which is mounted said memory unit and a memory controller, wherein said first and second memory riser boards each has mounted on a front surface thereof a plurality of memory modules each being connected sequentially one module after another to signal lines including address/command and data lines, each being accompanied by a clock signal line, wherein said signal lines start from said memory controller, and are sequentially connected to memory modules on said first memory riser board and then said second memory riser board, wherein at least said data line from said second memory riser board is connected back to said memory controller in a ring state, said connector comprising:

a plurality of connectors for connecting signal lines on said first memory riser board to corresponding signal lines on said second memory riser board.

26. An information processing system comprising:

a base board;

a memory controller provided on said base board; and a memory unit mounted on said base board for storing information under control of said memory controller, wherein said memory unit comprises:

a first memory riser board mounted on said base board through a first connector with a plurality of first memory modules mounted on the front surface of said first memory riser board, a second memory riser board mounted on said base board through a second connector with a plurality of second memory modules mounted on the front surface of said second memory riser board, wherein said first and second memory riser boards are arranged such that the back surface of said first memory riser board faces the back surface of said second memory riser board, and a board linking connector for connecting signal lines on said first memory riser board to corresponding signal lines on said second memory riser board, wherein said signal lines include address/command and data lines, each being accompanied by a clock signal line, that start from said memory controller, path through said first connector, are wires to said first memory modules mounted on said first memory riser board sequentially one module after another, pass through said board making connector and are wired to said second memory modules mounted on said second memory riser board sequentially one module after another, and wherein at least said data line further passes through said second connector and is mounted back to said memory controller in a ring state.

27. An information processing system according to claim 26, wherein said information processing system is a server.

28. An information processing system, comprising:

a base board;

a memory controller provided on said base board; and a memory unit mounted on said base board for storing data under control of said memory controller, wherein said memory unit comprises:

a memory riser board mounted on said base board through at least a connector, said memory riser board being provided with a plurality of front memory modules mounted on the front surface of said memory riser board and a plurality of back memory modules mounted on the back surface of said memory riser board, wherein signal lines including address/command and data lines, each being accompanied by a clock signal line, start from said memory controller, pass through said connector, are wired to said front memory modules mounted on said front surface of said first memory riser board sequentially one module after another, pass through the top of said memory riser board and are wired to said back memory modules mounted on said back surface of said memory riser board sequentially one module after another; and wherein at least said data line further passes through said connector and is connected back to said memory controller in a ring state.

29. An information processing system according to claim 28, wherein said information processing system is a server.

30. An information processing system, comprising:

a base board;

a memory controller provided on said base board; and a memory unit mounted on said base board for storing data under control of said memory controller, wherein said memory unit comprises:

a memory riser board mounted on said base board through at least a connector with a plurality of memory modules mounted on the front and back surfaces of said memory riser board, and a switch for connecting a data line wired to said connector to one of two data lines wired to said modules in accordance with a control signal output by said memory controller;

wherein signal lines including address/command lines, each being accompanied by a clock signal line, start from said memory controller, pass through said connector and are wired to said memory modules mounted on the front and back surfaces of said memory riser board sequentially one module after another; and wherein a data line including said data line wired to said connector and said two data lines wired to said memory modules starts from said memory controller, passes through said connector and said switch, is wired to said memory modules mounted on the front and back surfaces of said memory riser board sequentially one module after another, passes through said switch again and is folded back to said memory controller, said data lines passing to each of said modules from said memory controller in a ring state.

31. An information processing system according to claim 30, wherein said information processing system is a server.

* * * * *